US007346490B2

(12) United States Patent
Fass et al.

(10) Patent No.: US 7,346,490 B2
(45) Date of Patent: Mar. 18, 2008

(54) METHOD AND SYSTEM FOR DESCRIBING AND IDENTIFYING CONCEPTS IN NATURAL LANGUAGE TEXT FOR INFORMATION RETRIEVAL AND PROCESSING

(75) Inventors: Daniel C Fass, Vancouver (CA); Davide Turcato, Vancouver (CA); Gordon W Tisher, Surrey (CA); James Devlan Nicholson, Port Moody (CA); Milan Mosny, Vancouver (CA); Frederick P Popowich, New Westminster (CA); Janine T. Toole, Burnaby (CA); Paul G McFetridge, Vancouver (CA); Frederick W Kroon, Coquitlam (CA)

(73) Assignee: Axonwave Software Inc., Edmonton (CA)

( * ) Notice: Subject to any disclaimer, the term of this patent is extended or adjusted under 35 U.S.C. 154(b) by 639 days.

(21) Appl. No.: 10/398,129

(22) PCT Filed: Sep. 28, 2001

(86) PCT No.: PCT/CA01/01398

§ 371 (c)(1),
(2), (4) Date: Nov. 24, 2003

(87) PCT Pub. No.: WO02/27524

PCT Pub. Date: Apr. 4, 2002

(65) Prior Publication Data

US 2004/0078190 A1    Apr. 22, 2004

Related U.S. Application Data

(60) Provisional application No. 60/236,342, filed on Sep. 29, 2000.

(51) Int. Cl.
G06F 17/28 (2006.01)
(52) U.S. Cl. .................. 704/7; 707/1; 707/2; 707/3; 707/4; 707/5
(58) Field of Classification Search .................. 704/7; 707/1–5
See application file for complete search history.

(56) References Cited

U.S. PATENT DOCUMENTS

| 5,331,556 A | 7/1994 | Black, Jr. et al. ........ 364/419.08 |
| 5,594,641 A | 1/1997 | Kaplan et al. .............. 395/601 |

(Continued)

*Primary Examiner*—Richemond Dorvil
*Assistant Examiner*—Leonard Saint-Cyr
(74) *Attorney, Agent, or Firm*—Seed IP Law Group PLLC

(57) ABSTRACT

A method for information retrieval that matches occurrences of concepts in natural language text documents against descriptions of concepts in user queries. Said method, implemented in a computer system, includes a preferred version of the method that comprises (1) annotating natural language text in documents and other text-forms with linguistic information and Concepts and Concept Rules expressed in a Concept Specification Language (CSL) for a particular domain, (2) pruning and optimizing synonyms for a particular domain, (3) defining and learning said CSL Concepts and Concept Rules, (4) checking user-defined descriptions of Concepts represented in CSL (including user queries), and (5) retrieval by matching said user-defined descriptions (and queries) against said annotated text. CSL is a language for expressing linguistically-based patterns. Said patterns can represent the linguistic manifestations of concepts in text. Said concepts may derive from the sublanguages used by experts to analyze specialized domains including, but not limited to, insurance claims, police incident reports medical reports, and aviation incident reports.

94 Claims, 22 Drawing Sheets

U.S. PATENT DOCUMENTS

| | | | |
|---|---|---|---|
| 5,625,554 A * | 4/1997 | Cutting et al. | 707/100 |
| 5,628,003 A * | 5/1997 | Fujisawa et al. | 707/104.1 |
| 5,675,819 A | 10/1997 | Schuetze | 395/760 |
| 5,742,834 A | 4/1998 | Kobayashi | 395/760 |
| 5,799,268 A | 8/1998 | Boguraev | 704/9 |
| 6,026,388 A | 2/2000 | Liddy et al. | 707/1 |
| 6,076,088 A | 6/2000 | Paik et al. | 707/5 |
| 6,081,774 A | 6/2000 | de Hita et al. | 704/9 |
| 6,175,829 B1 * | 1/2001 | Li et al. | 707/3 |

* cited by examiner

METHOD AND SYSTEM FOR DESCRIBING AND IDENTIFYING CONCEPTS IN NATURAL LANGUAGE TEXT FOR INFORMATION RETRIEVAL AND PROCESSING

CROSS-REFERENCE TO RELATED APPLICATION

This application is a National Stage Application of International Application No. PCT/CA01/01398, filed Sep. 28, 2001, which claims the benefit under 35 USC 119(e) benefit of U.S. Provisional Patent Application No. 60/236,342, filed Sep. 29, 2000, where this provisional application is incorporated by reference in its entirety.

TECHNICAL FIELD

The present invention relates most directly to the field of information retrieval, but also to the fields of query languages and query specification, text processing and linguistic annotation, and machine learning/knowledge acquisition.

BACKGROUND OF THE INVENTION

1. Information Retrieval

Information retrieval (IR) refers to "the retrieval of documents . . . from large but specialized bodies of material, through the specification of document content rather than via keys like author names" (Sparck Jones, K., "Information Retrieval," In S. C. Shapiro (Ed.) *Encyclopedia of Artificial Intelligence*, 2$^{nd}$ Edition. John Wiley & Sons, New York, N.Y., pp. 1605-1613 (1992). In this invention the focus is on text retrieval (as opposed to audio or video retrieval). The problem of text retrieval has two parts: query specification, and retrieval of text documents.

Most IR systems use statistical techniques, depending on probabilistic models of query term distribution. For example, the Vector-Space approach is based on word occurrences (Sàlton, G., *The Smart Retrieval System—Experiments in Automatic Document Processing*, Prentice Hall, Englewood Cliffs, N.J. (1971). Documents and queries are represented in a multi-dimensional space where each dimension corresponds to a word in the document collection. Relevant documents are those whose vectors are closest to the query vector.

In contrast to the Vector-Space focus on word occurrence distribution, approaches like Latent Semantic Indexing (Deerwester, S., Dumais, S., Furnas, G., Landauer, T., and R. Harshman, "Indexing by Latent Semantic Analysis," *Journal of the American Society for Information Science*, 41, pp. 391-407 (1990) are concerned with word co-occurrences. In this approach, the fact that two or more terms occur in the same document more often than chance is exploited to reduce the dimensionality of document and query space. Recent variants of these two basic approaches are described in Robertson, S. E., and S. Walker, "Okapi/Keenbow at TREC-8," In E. M. Vorhees and D. K. Harman (Eds.), Proceedings of the Eighth Text Retrieval Conference (TREC-8), Gaithersburg, Md.: Department of Commerce, National Institute of Standards and Technology, NIST Special Publication 500-246, pp. 151-162 (1999); and Kwok, K., and M. Chan, "Improving Two-Stage Ad Hoc Retrieval for Short Queries," In Proceedings of SIGIR '98, pp. 250-256 (1998).

In contrast to these statistical approaches, there has been limited work that focusses on a rule-based or linguistic approach to IR. When used, such approaches are often combined with a statistical approach (Strzalkowski, T., Perez-Carballo, J., Karigren, J., Hulth, A., Tapanainen, P., and T. Lahtinen, "Natural Language Information Retrieval: TREC-8 report," In Proceedings of the Eighth Text Retrieval Conference (1999).

The present invention differs from the current state of the art in two key respects: it allows users to specify richer queries using a query specification language and it offers a richer annotation of documents that might be potentially retrieved. On top of these improvements is more sophisticated matching of the richer user queries against the more richly annotated documents. Unlike the statistical approaches, the present invention does not rely on the results of ranking to determine whether a document should be returned to the user. Instead, it matches documents against the concepts specified by the user. Ranking can be additionally used to prioritize documents, but it is not mandatory.

The present invention also differs from previous research because it does not only judge whether a document is relevant or not to a given query, it also identifies the specific portions of text that match the concept expressed by the input query. Therefore the present invention is not only relevant to IR purposes, but also to other fields like summarization and text mining.

Many patents describe methods and systems for information retrieval. Two of the most comprehensive recent IR patents are by Liddy et al. U.S. Pat. Nos. 5,963,940 and 6,026,388, but these differ markedly from the present invention. In particular, they do not provide its rich forms of annotation.

2. Query Languages and Query Specification

Query languages are traditionally associated with databases, i.e., repositories of structured data. Attempts have been made to extend database techniques and query languages to semi-structured data, particularly with the advent of the Worldwide Web (see, e.g., Buneman, P., "Semistructured Data." In Proceedings of the ACM Symposium on Principles of Database Systems, Tucson, Ariz. Invited tutorial (1997)). An attempt at creating a query language for the XML markup language can be found in Deutsch, A., Fernandez, M., Florescu, D., Levy, A., and D. Suciu, "XML-QL: A Query Language for XML." Submission to the World Wide Web Consortium 19 Aug. 1998 (August 1998).

The limitations of the current approaches to querying unstructured data are pointed out in Lacroix, Z., Sahaguet, A., Chandrasekar, R., and B. Srinivas, "A Novel Approach to Querying the Web: Integrating Retrieval and Browsing." In ER97 Workshop on Conceptual Modeling for Multimedia Information Seeking, Los Angeles, Calif., USA (November 1997). Most notably, the present invention suggests integrating query languages with some sort of text processing and IR techniques.

In a typical IR session, users specify their information needs by using key words, or by typing their requests using a natural language such as English (Manning, C., and H. Schutze, *Foundations of Statistical Natural Language Processing*, MIT Press, Cambridge, Mass. (1999)). Query languages in IR have been mostly confined to simple approaches like the bag-of-words approach. The IR. system then converts these query words into a format relevant for the particular IR engine.

The present invention differs from these approaches in that it uses a specification language for the user to specify a query. The specification language allows the user to specify lexical, syntactic or semantic relationships. Using the specification language, the user specifies concepts that are required in the document, rather than just key words or entire natural language sentences. Concepts specified in this way are more accurate than simple keywords, and more general and flexible than complete sentences.

3. Text Processing and Linguistic Annotation

Linguistic annotation schemas exist for various kinds of linguistic information: phonetics, morphology, syntax, semantics, and discourse. See Bird, S., and M. Lieberman, "A Formal Framework for Linguistic Annotation." University of Pennsylvania, Dept. of Computer and Information Science, Technical Report MS-CIS-99-01 (1999) for a definition of 'linguistic annotation' and a review of the literature on linguistic annotation.

U.S. Pat. No. 5,331,556, Black et al. entitled "Method for natural language data processing using morphological and part-of-speech information" discloses in the abstract, "the method includes executing linguistic analysis upon a text corpus file to derive morphological, part-of-speech information as well as lexical variants . . . to construct an enhanced text corpus file. A query text file is linguistically analyzed to construct a plurality of trigger token morphemes . . . used to construct a search mask stream . . . A match between the search mask stream and the enhanced corpus file allows a user to retrieve selected portions of the enhanced text corpus." However, U.S. Pat. No. 5,331,556 describes only a relatively general form of annotation, unlike the rich forms of annotation described in the present invention.

4. Machine Learning/Knowledge Acquisition

Machine learning (ML) refers to the automated acquisition of knowledge, especially domain-specific knowledge (cf.Schlimmer, J. C., and P. Langley, "Learning, Machine," In S. C. Shapiro (Ed.) *Encyclopedia of Artificial Intelligence*, 2$^{nd}$ *Edition*. John Wiley & Sons, New York, N.Y., pp. 785-805 (1992), p. 785). In the context of the present invention, ML concerns learning Concepts.

The system most closely related to the present task is Riloff's (1993) AutoSlog, a knowledge acquisition tool that uses a training corpus to generate proposed extraction patterns for the CIRCUS extraction system. See Riloff, E., "Automatically Constructing a Dictionary for Information Extraction Tasks," In Proceedings of the Eleventh National Conference on Artificial Intelligence (AAAI-93), pp. 811-816 (1993). A user either verifies-or rejects each proposed pattern.

J.-T. Kim and D. Moldovan's (1995) PALKA system is a ML system that learns extraction patterns from example texts. See Kim, J.-T., and D. I. Moldovan, "Acquisition of Linguistic Patterns for Knowledge-Based Information Extraction," *IEEE Transactions on Knowledge and Data Engineering*, 7 (5), pp. 713-724 (October 1995). The patterns are built using a fixed set of linguistic rules and relationships. Kim and Moldovan do not suggest how to learn syntactic relationships that can be used within extraction patterns learned from example texts.

In Transformation-Based Error-Driven Learning (See Brill, E., "A Corpus-Based Approach to Language Learning," PhD. Dissertation, Department of Computer and Information Science, University of Pennsylvania, Philadelphia, Pa. (1993)), the algorithm works by beginning in a naive state about the knowledge to be learned. For instance, in tagging, the initial state can be created by assigning each word its most likely tag, estimated by examining a tagged corpus, without regard to context. Then the results of tagging in the current state of knowledge are repeatedly compared to a manually tagged training corpus and a set of ordered transformations is learnt, which can be applied to reduce tagging errors. The learnt transformations are drawn from a pre-defined list of allowable transformation templates. The approach has been applied to a number of other NLP tasks, most notably parsing (See Brill, E., "Transformation-Based Error-Driven Parsing," In Proceedings of the Third International Workshop on Parsing Technologies. Tilburg, The Netherlands (1993)).

The Memory-Based Learning approach is "a classification based, supervised learning approach: a memory-based learning algorithm constructs a classifier for a task by storing a set of examples. Each example associates a feature vector (the problem description) with one of a finite number of classes (the solution). Given a new feature vector, the classifier extrapolates its class from those of the most similar feature vectors in memory" (See Daelemans, W., S. Buchholz, and J. Veenstra, "Memory-Based Shallow Parsing," In Proceedings of the Computational Natural Language Learning (CoNLL-99) Workshop, Bergen, Norway, 12 Jun. 1999 (1999)).

Explanation-Based Learning is "a technique to formulate general concepts on the basis of a specific training example" (van Harmelen, F., and A. Bundy, "Explanation-Based Generalization=Partial Evaluation (Research Note)," *Artificial Intelligence*, 36, pp. 401-412 (1988) ). A single training example is analyzed in terms of knowledge about the domain and the goal concept under study. The explanation of why the training example is an instance of the goal concept is then used as the basis for formulating the general concept definition by generalizing this explanation.

Huffman, U.S. Pat. Nos. 5,796,926 and 5,841,895 describe methods for automatic learning of syntactic/grammatical patterns for an information extraction system. The present invention also describes methods for automatically learning linguistic information (including syntactic/grammatical information), but not in ways described by Huffman.

BRIEF DESCRIPTION OF THE DRAWINGS

In drawings which illustrate a preferred embodiment of the invention.

DESCRIPTION

Figure 1:
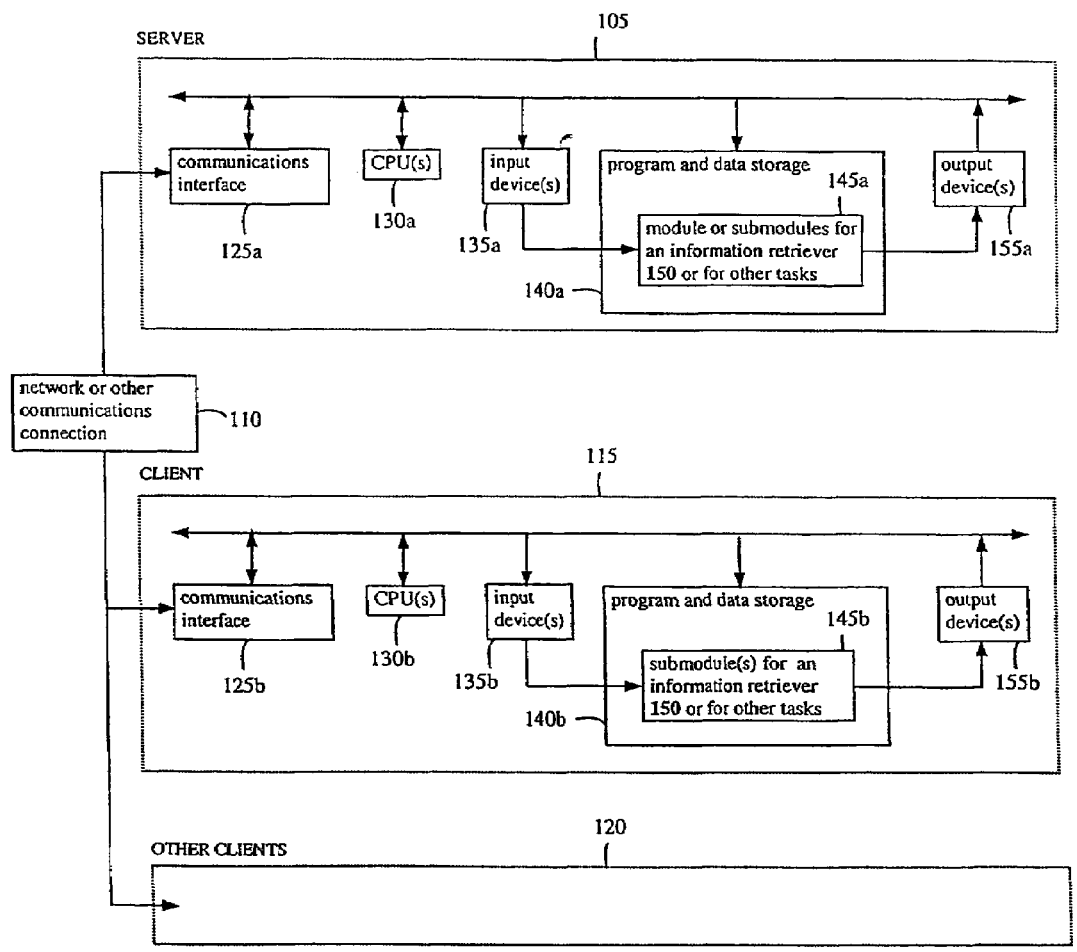
FIG. 1 is a hardware block diagram showing an apparatus according to the invention.

The present invention is described in three sections. Two versions of a method for information retrieval (IR) are described in section 1. Two versions of a system for IR are described in section 2. One system uses the first method of section 1; the second system uses the second method. The preferred embodiment of the present invention is the second system. Finally, a concept specification language called CSL (short for Concept Specification Language) is described in section 3.

The term "document" herein includes any body of data including text, collection of data including text, storage medium containing textual data or other text-forms.

Method

Two versions of a method for IR are described. The first method uses concept specification languages in general and—though not necessarily—text markup languages in general. The second method uses CSL and—though not necessarily—TML (short for Text Markup Language), a type of text markup language. Both methods can be performed on a computer system or other systems or by other techniques or by other apparatus.

1.1. Method Using Concept Specification Languages and (Optionally) Text Markup Languages The first IR method uses concept specification languages in general and—though not necessarily—text markup languages in general. That is to say, the first method necessarily uses concept specification languages in general, but does not require the use of a text markup language. The method matches text in documents and other text-forms against user-defined descriptions of concepts, and comprises up to eleven steps, which are now described.

Step (1) is the identification of linguistic entities in the text of documents and other text-forms. The linguistic entities identified in step (1) include, but are not limited to, morphological, syntactic, and semantic entities. The identification of linguistic entities in step (1) includes, but is not limited to, identifying words and phrases, and establishing dependencies between words and phrases. The identification of linguistic entities is accomplished by methods including, but not limited to, one or more of the following: preprocessing, tagging, and parsing.

Step (2) is the annotation of those identified linguistic entities from step (1) in, but not limited to, a text markup language to produce linguistically annotated documents and other text-forms. The process of annotating the identified linguistic entities from step (1), is known as linguistic annotation.

Step (3), which is optional, is the storage of these linguistically annotated documents and other text-forms.

Step (4) is the identification of concepts using linguistic information, where those concepts are represented in a concept specification language and the concepts-to-be-identified occur in one of the following forms:

text of documents and other text-forms in which linguistic entities have been identified as per step (1), or the linguistically annotated documents and other text-forms of step (2); or the stored linguistically annotated documents and other text-forms of step (3).

A concept specification language allows representations (e.g., rules) to be defined for concepts in terms of a linguistics-based pattern or set of patterns. Each pattern (or phrasal template) consists of words, phrases, other concepts, and relationships between words, phrases, and concepts. For example, the concept HighWorkload is linguistically expressed by the phrase high workload. In a concept specification language, patterns can be written that look for the occurrence of high and workload in particular syntactic relations (e.g., workload as the subject of be high; or high and workload as elements of the same nominal phrase, e.g., a high but not unmanageable workload). Expressions can also be written that seek not just the words high and workload, but also their synonyms.

All methods for identifying concepts work by matching linguistics-based patterns in a concept representation language against linguistically annotated texts. A linguistics-based pattern from a concept representation language is a partial representation of linguistic structure. Each time a linguistics-based pattern matches a linguistic structure in a linguistically annotated text, the portion of text covered by that linguistic structure is considered an instance of the concept.

Methods for identifying concepts can be divided into non-index-based methods for identifying concepts and index-based methods. Non-index-based methods for identifying concepts include, but are not limited to, compiling the concept specification language into finite state automata (FSAs) and matching those FSAs against linguistically annotated documents, recursive descent matching, and bottom-up matching.

Recursive descent matching consists of traversing a concept specification expression and recursively matching its constituents against linguistic structures in annotated text. Bottom-up matching consists of the bottom-up generation of spans for words and constituents from linguistic structures in annotated text, and matching those spans against expression in the concept specification language. (A span is one or more words or constituents that follow each other plus, optionally, structural information about those words and constituents.)

Index-based methods for identifying concepts employ an inverted index. An inverted index contains words, constituents, and (if available) tags for linguistic information present in linguistically annotated text. The index also contains spans for those words, constituents, and tags from linguistically annotated text.

Index-based methods for identifying concepts include, but are not limited to, simple index-based matching, and candidate checking index-based matching.

In simple index-based matching, iterators are attached to all the items in the expression in a concept specification language, then uses index information about the state of each iterator to generate and match spans that, if successful, cover the text selected for concept identification;

In candidate checking index-based matching, sets of candidate spans are identified, where a candidate span is a span that might, but does not necessarily, contain a concept to be identified (matched). Any span that is not covered by a candidate span from the sets of candidate spans is one that cannot contain a concept to be identified (matched). Each subexpression of an expression in the concept specification language is associated with a procedure, and each such procedure is used to generate candidate spans or to check whether a given span is a candidate span. These candidate spans can serve as input to the four other concept identification methods just described, plus any other concept identification method.

Compiling and matching finite state automata, recursive descent matching, bottom-up matching, and any other possible concept identification method could be made into index-based methods by employing an inverted index.

Step (5) is the annotation of the concepts identified in step (4), e.g., concepts like HighWorkload, to produce conceptually annotated documents and other text-forms. (conceptually annotated documents are also sometimes referred to in this description as simply "annotated documents.") The process of annotating the identified concepts from step (5) is known as conceptual annotation. As with step (2), conceptual annotation is in, but is not limited to, a text markup language.

Step (6), which is optional like step (3), is the storage of these conceptually annotated documents and other text-forms.

Steps (7), (8), and (9) are optional and independent of each other and the other steps. Step (7) is synonym pruning, which takes some synonym resource as input and establishes a set of domain-specific synonyms of natural language words and phrases for a specific knowledge domain. The pruning method either a manual pruning step or an automatic pruning or a combination of the two, followed by filtering. Manual pruning is applied to the synonymy relations more relevant in the specific domain. A synonymy relation is a relationship between two terms that are not synonyms. Relevance is measured by a score based on the frequency of words in a domain specific corpus.

The method for automatically pruning assigns a score to candidate synonymy relations, based on the frequency of the relevant words, and other semantically related terms, in a domain specific corpus. During filtering, a filtering threshold is set and applied, and all candidates with a score beyond the threshold are eliminated.

Step (8) is synonym optimization in which a synonym resource (such as a machine-readable dictionary) is optimized by removing irrelevant sets of synonyms, or redundant sets of synonyms, or both. In optimization, such synonyms are removed in order to increase the accuracy and reduce the size of the synonym resource.

Step (9) is defining and learning the concept representations of the concept specification language, where the concept representations to be defined and learned include, but are not limited to, hierarchies, rules, operators, patterns, and macros.

Concept representations can be either defined by an operator or acquired (that is, learned) from a corpus. The learning of concept representations from corpora includes, but is not limited to, highlighting instances of concepts in the unprocessed text (or linguistically annotated text) of documents and other text-forms, then creating new concept representations in the concept specification language from those highlighted instances of concepts, then adding and, if necessary, integrating those concept representations in the concept specification language with pre-existing concept representations from the language.

The method of creating new concept representations in step (9) includes, but is not limited to, using the concept identification methods of step (4) to match together concept specification language vocabulary specifications and highlighted linguistically annotated documents and other text-forms, then defining linguistic variants; then adding synonyms from a set of synonyms, possibly supplied by synonym pruning and optimization, and then adding part of speech information as appropriate.

Step (10) is checking user-defined descriptions of concepts represented in the concept specification language. A common form of checking is checking user queries represented in the concept representation language, since user queries are a type of user-defined description of concepts. When checking user queries, those queries are analyzed. Depending on the query content and the current state of knowledge about queries available courtesy of any repositories of pre-stored queries, a decision is made as to the appropriate way to process the incoming user query.

If all known queries are described in the concept representation language, then a proposed query is itself described in the representation language and is subsequently used by the retrieval method of step (11).

If all queries to be described in the concept representation language are not known in advance, then a proposed query is described in the representation language and matched against the repository of pre-stored queries. If a match is found, the query is subsequently used by the method of retrieval. If a match is not found, the proposed query is subsequently sent for concept identification as per step (4).

Step (11) is the retrieval of text documents and other text-forms. Retrieval is based on matching user-defined descriptions of concepts (e.g., user queries) against conceptually annotated documents and other text-forms. The format of the output of retrieval depends on the application task for which the system has been configured (e.g., document ranking, document categorization, etc.).

1.2. Method Using CSL and (Optionally) TML

The second IR method uses CSL and—though not necessarily—TML, a type of text markup language. That is to say, the method necessarily uses CSL, but does not require the use of TML.

CSL is a language for expressing linguistically-based patterns. It is comprised of tag hierarchies, Concepts,. Concept Rules, Patterns, Operators, and macros. One type of CSL Pattern is a "single-term Pattern" which may refer to the name of a word, and optionally, its part of speech tag (a simple lexical tag or phrasal tag, if a tagger is used), and also optionally, synonyms of the word. Another type of CSL Pattern is a "configurational Pattern." Configurational Patterns may have the form A Operator B, where the operator can be, among others, a Boolean (such as OR) and can express relationships such as dominance and precedence. Section 3 gives a definition of CSL.

TML presently has the syntax of XML (an abbreviation of (extensible Markup Language), though TML isn't required to have the same syntax. A text annotated with TML could be used for a variety of natural language processing tasks such as information retrieval, text categorization, or even text mining. TML can easily be maintained and modified by non-experts. More lengthy descriptions of TML are given later.

The second method consists of the same basic steps, and relationships among the steps, as the first method. There are two differences between the two methods. The first difference is that wherever a concept specification language is used in the first method, CSL is used in the second. The second difference is that where ever a text markup language is referred to in the first method, TML is used in the second.

Hence, for example, in step (4) of the second method, the concept specification language is CSL and the step consists of identifying CSL Concepts and Concept Rules using linguistic information, not identifying the concepts of concept specification languages in general. A preferred embodiment of the second method is given in section 2.3.

2. System

Two versions of an IR system, using a common computer architecture, are described. One system employs the method described in section 1.1; hence it uses concept specification languages in general and—though not necessarily—text markup languages in general. The other system employs the method described in section 1.2; hence it uses CSL and—though not necessarily—TML. The preferred embodiment of the present invention is the second system. First, however, the common computer architecture is described.

2.1. Computer Architecture

FIG. 1 is a simplified block diagram of a computer system embodying the information retrieval system of the present invention. The invention is typically implemented in a client-server configuration including a server 105 and numerous clients connected over a network or other communications connection 110. The detail of one client 115 is shown; other clients 120 are also depicted. The term "server" is used in the context of the invention, where the server receives queries from (typically remote) clients, does substantially all the processing necessary to formulate responses to the queries, and provides these responses to the clients. However, the server 105 may itself act in the capacity of a client when it accesses remote databases located on a database server. Furthermore, while a client-server configuration is one option, the invention may be implemented as a standalone facility, in which case client 120 would be absent from the figure.

The server 105 comprises a communications interface 125$a$ to one or more clients over a network or other communications connection 110, one or more central processing units (CPUs) 130$a$, one or more input devices 135$a$, one or more program and data storage areas 140$a$ comprising a module and one or more submodules 145$a$ for an information retriever 150 or processes for other purposes, and one or more output devices 155$a$.

The one or more clients comprise a communications interface 125$b$ to a server over a network or other communications connection 110, one or more central processing units (CPUs) 130$b$, one or more input devices 135$b$, one or more program and data storage areas 140$b$ comprising one or more submodules 145$b$ for an information retriever 150 or processes for other purposes, and one or more output devices 155$b$.

2.2. System Using Concept Specification Languages and (Optionally) Text Markup Languages The first system uses the computer architecture described in section 2.1 and FIG. 1. It also uses the method described in section 1.1; hence it uses concept specification languages in general and—though not necessarily—text markup languages in general. A description of this system can be assembled from sections 1.1 and 2.1. Although not described in detail within this section, this system constitutes part of the present invention.

2.3. System Using CSL and (Optionally) TML

The second system uses the computer architecture described in section 2.1 and FIG. 1. This system employs the method described in section 1.2; hence it uses CSL and—though not necessarily—TML. The preferred embodiment of the present invention is the second system, which will now be described with reference to FIGS. 2 to 35. The system is written in the C programming language, but could be embodied in any programming language. The system is an information retriever and is described in section 2.3.1.

2.3.1. Information Retriever

Figure 2:
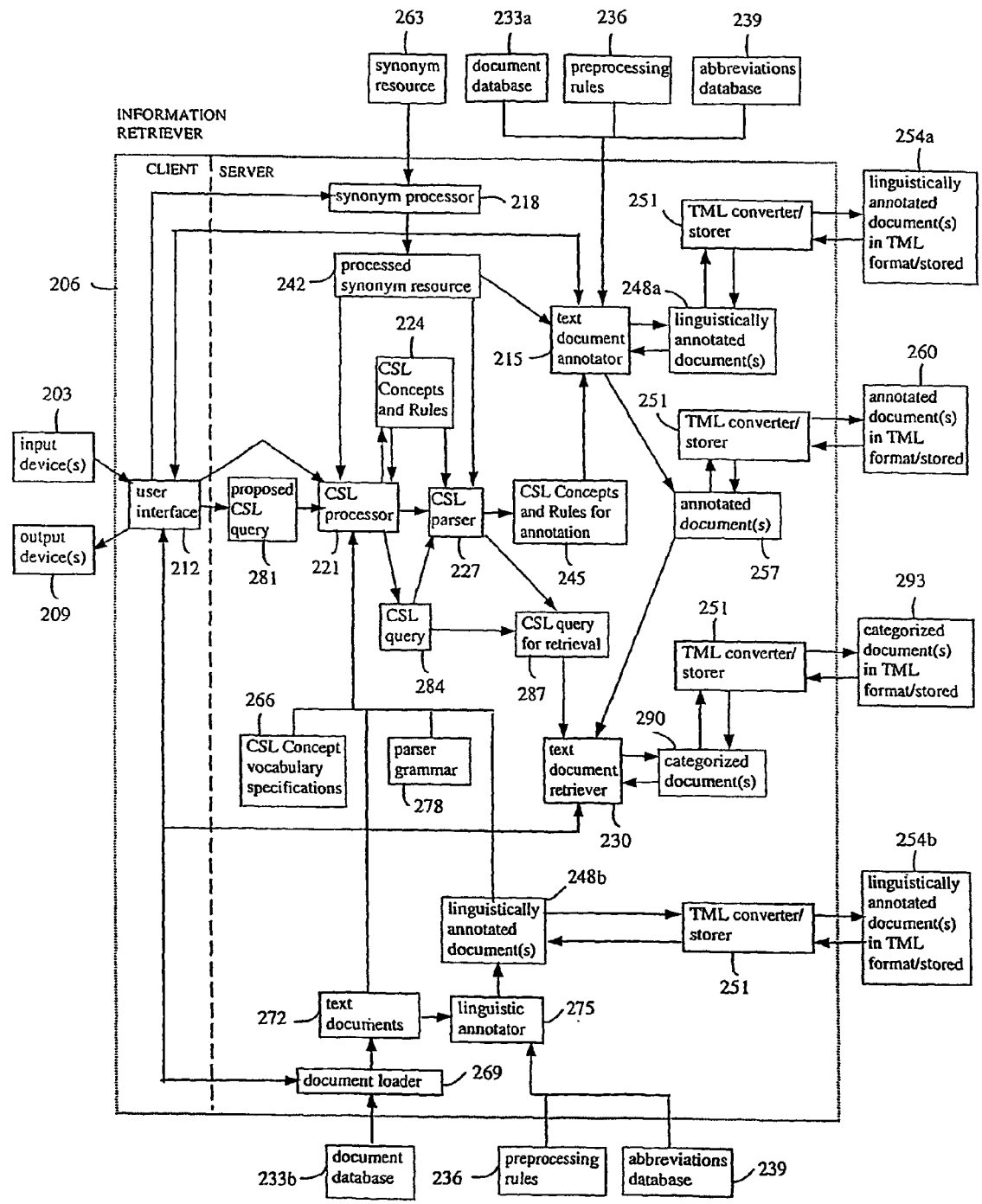
FIG. 2 is a block diagram of the information retriever module shown in FIG. 1.

FIG. 2 is a simplified block diagram of the information retriever 206. The information retriever takes as input text in documents and other text-forms in the form of a signal from one or more input devices 203 to a user interface 212, and carries out predetermined information retrieval processes to produce a collection of text in documents and other text-forms, which are output from the user interface 212 in the form of a signal to one or more output devices 209.

The user interface 212 comprises windows for the loading of text documents, the processing of synonyms, the identification of concepts, the definition and learning of concepts, the formulation of user queries, and the viewing of search results.

The predetermined information retrieval processes, accessed by the user interface 212, comprise a text document annotator 215, synonym processor 218, CSL processor 221, CSL parser 227, and text document retriever 230. All these processes are described below. During these descriptions, all the boxes in FIG. 2 not mentioned in this section will be referred to, e.g., Section 2.3.10. on the synonym processor 218, refers to the synonym resource 242 and the processed synonym resource 242.

2.3.2. Text Document Annotator

Figure 3:
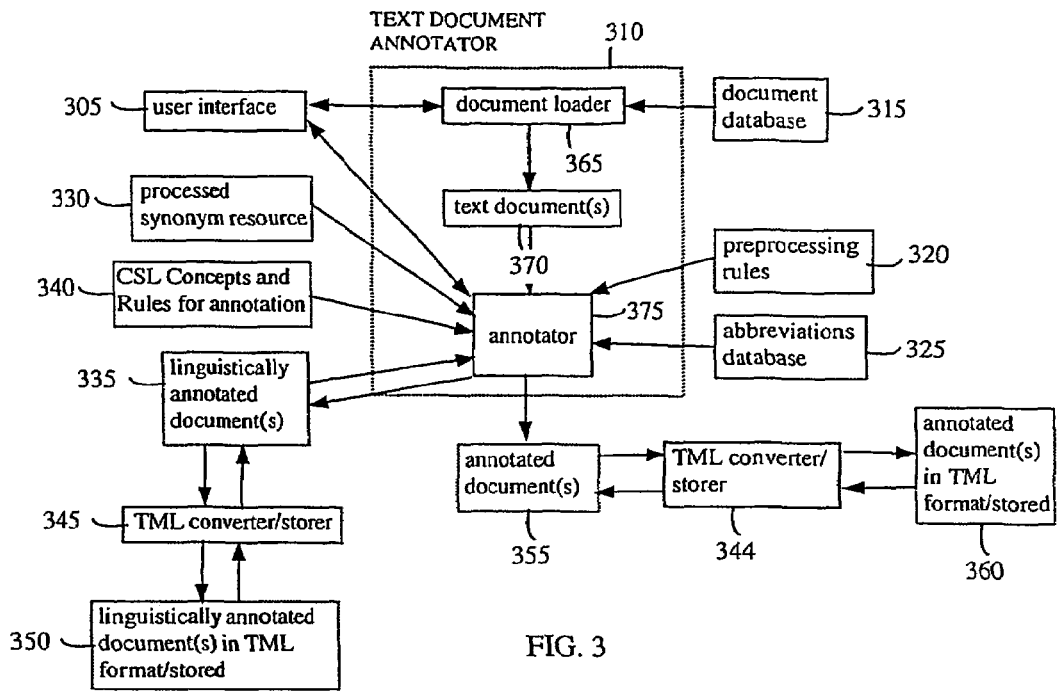
FIG. 3 is a block diagram of the text document annotator module shown in FIG. 2.

FIG. 3 is a simplified block diagram of the text document annotator 310. The text document annotator 310, accessed by the user interface 305, comprises a document loader 365 from a document element database 315, which passes text documents 370 to the annotator 375. The annotator 375 outputs annotated documents 355.

2.3.3. Annotator

Figure 4:
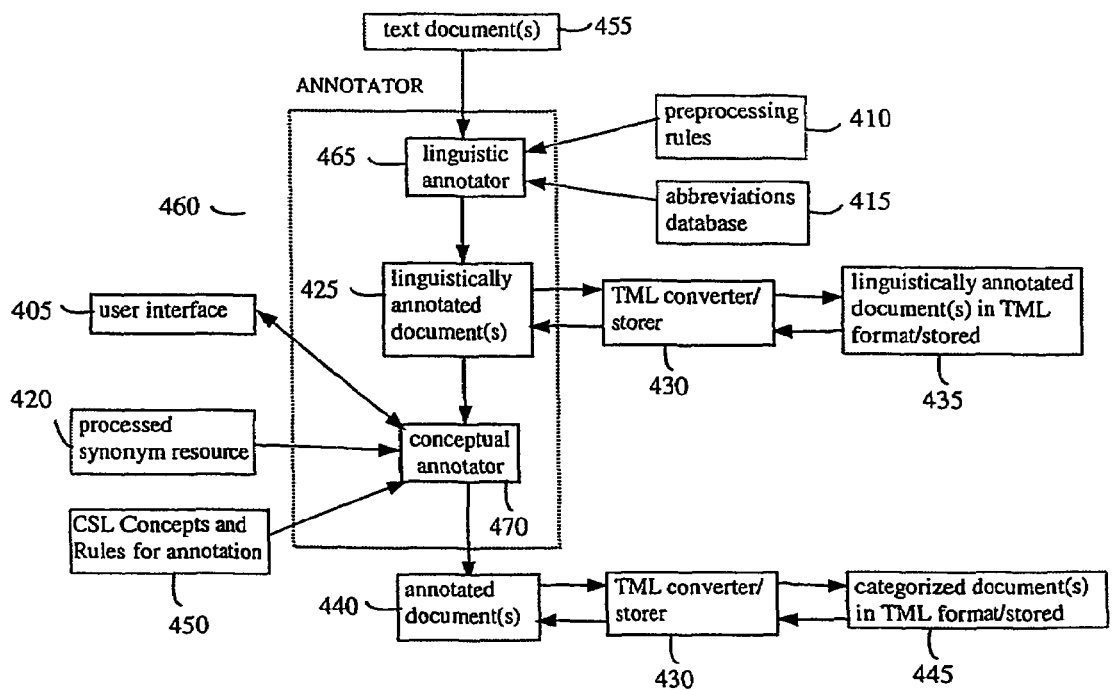
FIG. 4 is a block diagram of the annotator module shown in FIG. 3.

FIG. 4 is a simplified block diagram of the annotator 460. The annotator 460 takes as input one or more text documents 455 and outputs corresponding documents, where the text is augmented with annotations representing linguistic and conceptual information 440. The annotator 460 is comprised of a linguistic annotator 465 which passes linguistically annotated documents 425 to a conceptual annotator 470.

The linguistically annotated documents 425 may be annotated in Text Markup Language (TML) 435 by passing them through a TML converter 430 (or converter for some other markup language), and may be stored 435.

TML presently has, but is not limited to, the syntax of XML (extensible Markup Language), but could have the syntax of any markup language. TML could have any syntax, but the present invention uses the syntax of XML for efficiency reasons. Because TML presently has the syntax of XML, the TML converter used by the system 430 is presently also an XML converter, though the TML converter 430 is not of necessity also an XML converter.

A TML object is a tree-structure, where each node is associated with a label. The top element (i.e., the root of the tree-structure) is a label (e.g., 'TML') identifying the structure as a TML object. In the following we refer to elements as nodes in the tree-structure, each of which associated with a label. Each element specifies some kind of object, identified by an appropriate label. Within the top-level node are text elements (associated with a label like 'TEXT', for instance). Within each text element there are a number of sentence elements. Within the sentence elements are grammatical elements, i.e., syntactic constituents comprising a sentence. The grammatical elements are identified by grammatical tags, as assigned by a parser operated by the information retriever (206 in FIG. 2). Grammatical elements can have a role element associated with them, i.e., in addition to a label identifying their type of constituent, they can have a further label identifying their role in the sentence (subject, object, etc.). Each grammatical element (constituent) can in turn comprise further constituents. At the bottom of a constituent hierarchy there are text-word elements. Each text-word element has one word in it. Each word has a base element (i.e., a node representing its base form, or lemma), a role element (as previously defined), and a tag element (defining the word's part of speech).

It is not necessary to impose a Document Type Definition (DTD) on TML, unlike other text markup languages that have the syntax of XML, because the DTD would have to duplicate the type definition defined in the grammar used by the system's parser, which would be redundant.

2.3.4. Linguistic Annotator

Figure 5:
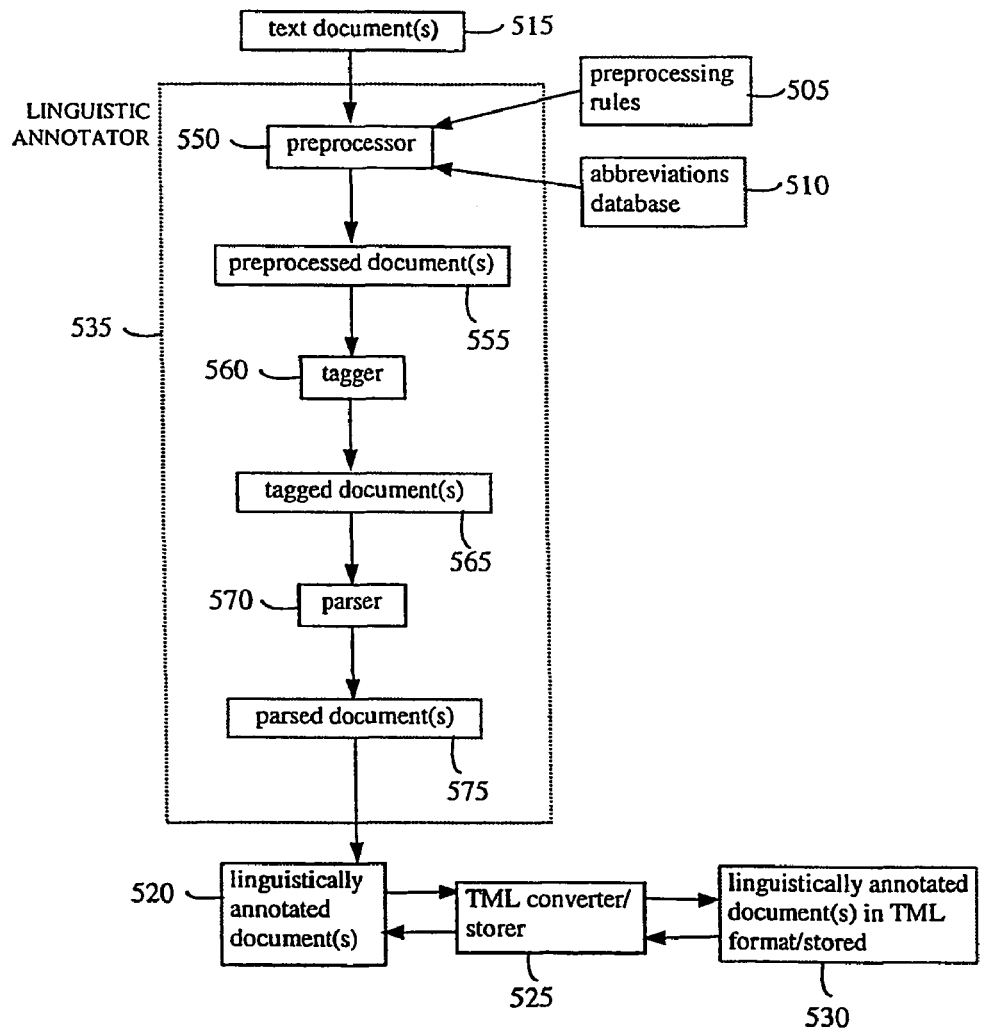
FIG. 5 is a block diagram of the linguistic annotator module shown in FIG. 4.

FIG. 5 is a simplified block diagram of the linguistic annotator 535. The linguistic annotator 535 takes as input one or more text documents 515, preprocessing rules (i.e., rewriting rules mapping input text expressions onto corresponding output expressions) 505, and information from a database of abbreviations 510. The linguistic annotator 535 outputs one or more linguistically annotated documents 520. The annotated information represents linguistic information about the input text documents 515.

The linguistic annotator 535 is comprised of a preprocessor 550, tagger 560, and parser 570. In the preferred embodiment, all three are used, as shown in FIG. 5; however, any configuration of these (or any other linguistic identification) as part of the information retriever shown in FIG. 2 is within the scope of the present invention.

2.3.5. Preprocessor

Figure 6:
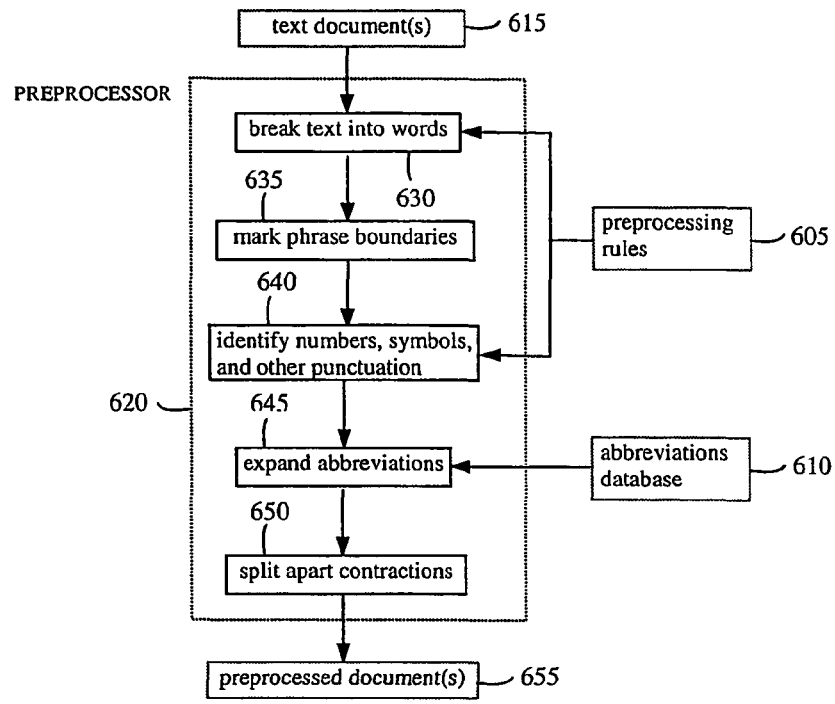
FIG. 6 is a block diagram of the preprocessor module shown in FIG. 5.

FIG. 6 is a simplified block diagram of the preprocessor 620. The preprocessor takes as input one or more text documents 615 and outputs one or more preprocessed (or tokenized) documents 655. The input text is a continuous stream of text. The output is the same text tokenized, i.e., broken into discrete units (words, punctuation, etc.), each augmented with information about its type (word, symbol, number, etc.). The preprocessor performs the following:

a) breaks a continuous stream of text into discrete units (words) 630 using preprocessing rules 605;

b) marks phrase boundaries 635;

c) identifies numbers, symbols, and other punctuation 640 using preprocessing rules 605;

d) expands abbreviations 645 using an abbreviations database 610; and e) splits apart contractions 650.

The preprocessor 620 is responsible for breaking text into words 630 using preprocessing rules 605. The preprocessor 620 takes as input non-annotated text. It assigns a marker to each word found and outputs words on individual lines separated by a tab character. For instance, the following could be chosen as a set of valid markers:

| | | |
|---|---|---|
| _num | a number | "one", "2nd" . . . |
| _sym | a symbol | "$", "%", "+" . . . |
| _punct | punctuation | "(" ", " "&" . . . |
| _word | anything else | |

The preprocessor 620 is also responsible for marking phrase boundaries 635. Marking a phrase boundary includes, but is not limited to, identifying sentence final punctuation, such as a period.

The preprocessor 620 identifies numbers, symbols, and other punctuation 640 using preprocessing rules 605. When sentence final punctuation is found, the preprocessor outputs the punctuation followed by an end of phrase marker "<<EOP>>". Sentence final punctuation is defined by the following: "!", ".", ". . . ", ":", ";", and "?".

The preprocessor 620 employs an abbreviation expander 645. The expander 645 replaces abbreviations. It works on character strings and returns a string in which the abbreviation is expanded.

The abbreviation expander 645 uses as a knowledge resource an abbreviation database 610, though it could use other resources. In the abbreviation database 610, each line contains an abbreviation and its expansion separated by a single tab character.

The preprocessor 620 also splits apart contractions 650. Contractions are split into separate words. Some examples of contractions split into complete words are shown in Table 1.

TABLE 1

| Contraction | Word 1 | Word 2 |
|---|---|---|
| I'm | I | 'm |
| I'd | I | 'd |
| I'll | I | 'll |
| I've | I | 've |
| you're | you | 're |
| don't | do | n't |
| deans' | deans | s' |

2.3.6. Tagger

Figure 7:
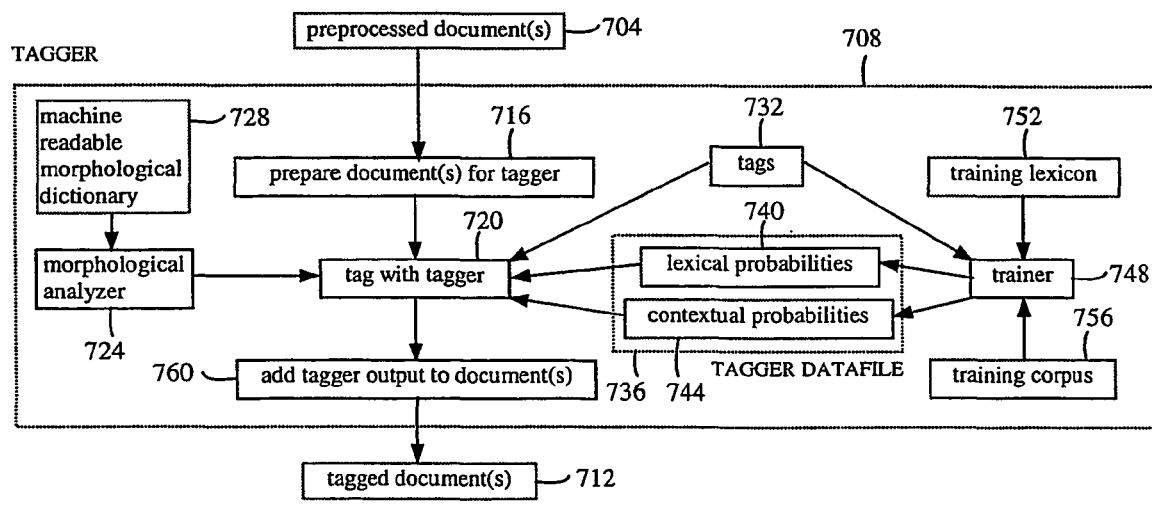
FIG. 7 is a block diagram of the tagger module shown in FIG. 5.

FIG. 7 is a simplified block diagram of the tagger 708. The tagger 708 takes as input one or more preprocessed documents 704, data from a machine-readable morphological dictionary 728 that has been processed by a morphological analyzer 724, tag information 732, and lexical probabilities 740 and contextual probabilities 744 from the tagger's datafile 736. The tagger 708 outputs one or more tagged documents 712, i.e., the input preprocessed documents 704 augmented with part of speech information for each token in those documents.

The tagger 708 is responsible for assigning an appropriate part of speech from a given tagset to each word given to it (e.g., the UPenn tagset). It is also responsible for determining the base (uninflected) form of the word. The tagger 708 makes use of a tagger datafile 736 produced by a trainer module 748, and a file which specifies the tags used 732. The tagger is case-insensitive.

The preprocessed documents 704 are prepared for use 716 by the tagger. The tagger 708 receives as input a word and an optional alternate word as input. The alternate word is tried if the primary word is not present in the lexicon of the tagger datafile. The lexicon is case-insensitive.

The tagger 708 and trainer 748, work with tag sequences of a given length n. The tagger datafile 736 contains lexical probabilities 740 and contextual probabilities 744. The contextual probabilities 744 refer to tag sequences of the aforementioned length, and represent the conditional probability of a given tag given the preceding tags. Because of this, the tag for a given input word will not be determined until additional n words have been input. Flushing or stopping the tagger will force all input words to be assigned a tag.

Starting the tagger causes it to automatically input n leading words called the start gutter. These special words can only have one tag which is the start tag, a special tag not defined in the tagset being used. Flushing or stopping the tagger causes it to input n trailing words called the stop gutter. These special words can also only have one tag which is the stop tag, also not defined in the tagset being used. The start and stop gutters do not appear in the output. The reason for the gutters is to improve tagger performance on words that appear at the start and end of phrases.

The tagger operates on the preprocessed documents as follows.

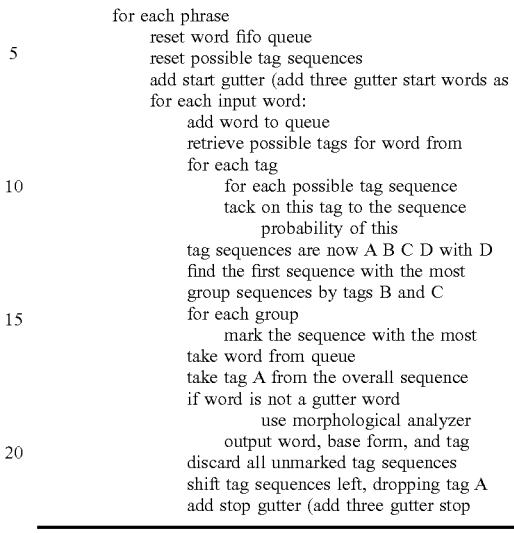

```
for each phrase
    reset word fifo queue
    reset possible tag sequences
    add start gutter (add three gutter start words as
    for each input word:
        add word to queue
        retrieve possible tags for word from
        for each tag
            for each possible tag sequence
                tack on this tag to the sequence
                    probability of this
        tag sequences are now A B C D with D
        find the first sequence with the most
        group sequences by tags B and C
        for each group
            mark the sequence with the most
        take word from queue
        take tag A from the overall sequence
        if word is not a gutter word
            use morphological analyzer
                output word, base form, and tag
        discard all unmarked tag sequences
        shift tag sequences left, dropping tag A
    add stop gutter (add three gutter stop
```

For each input word, the tagger outputs the primary word, its base form (as given by a morphological analyzer 724), and a tag from the tagset being used. This output is added to documents 760. Final output is a set of tagged documents 712.

2.3.7. Parser

Figure 8:
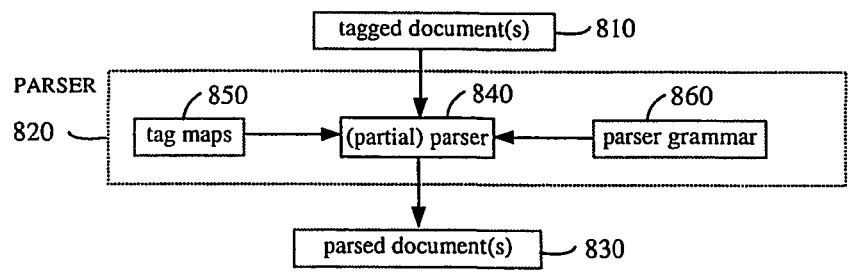
FIG. 8 is a block diagram of the parser module shown in FIG. 5.

FIG. 8 is a simplified block diagram of the parser 820. The parser, which may be a partial parser 840, takes as input one or more tagged documents 810, data from tag maps 850 and a grammar 860, and outputs one or more parsed documents 830. A linguistically annotated document is a tagged document augmented with syntactic information and other linguistic information for each sentence in the document.

Dependencies are established by parsing. The parser is responsible for assigning a parse structure to input text and assigning roles to the found constituents. Considerations of efficiency and robustness suggest that the best-suited parsers for this purpose, given the current state of the art in parsing, are those collectively known as partial parsers 840, an instance of which is the partial parser Cass2 produced by Steven Abney. See Abney, S., "Part-of-Speech Tagging and Partial Parsing," In K. Church, S. Young, and G. Bloothooft (Eds.), *Corpus-Based Methods in Language and Speech*. Kluwer Academic Publishers, Dordrecht, The Netherlands (1996).

The partial parser 840 takes as input words, word base forms, and part of speech tag information. On receipt of an end-of-phrase marker the partial parser 840 will parse the input it has received so far.

The partial parser 840 uses as data files tag maps 850 and a grammar 860. The tag maps contain a mapping from the tagset being used by the tagger (708 in FIG. 7) to the internal tagset used by the grammar 860. The grammar 860 contains the descriptions of the rules to be used by the parser to partial parse the input.

2.3.8. Conceptual Annotator

Figure 9:
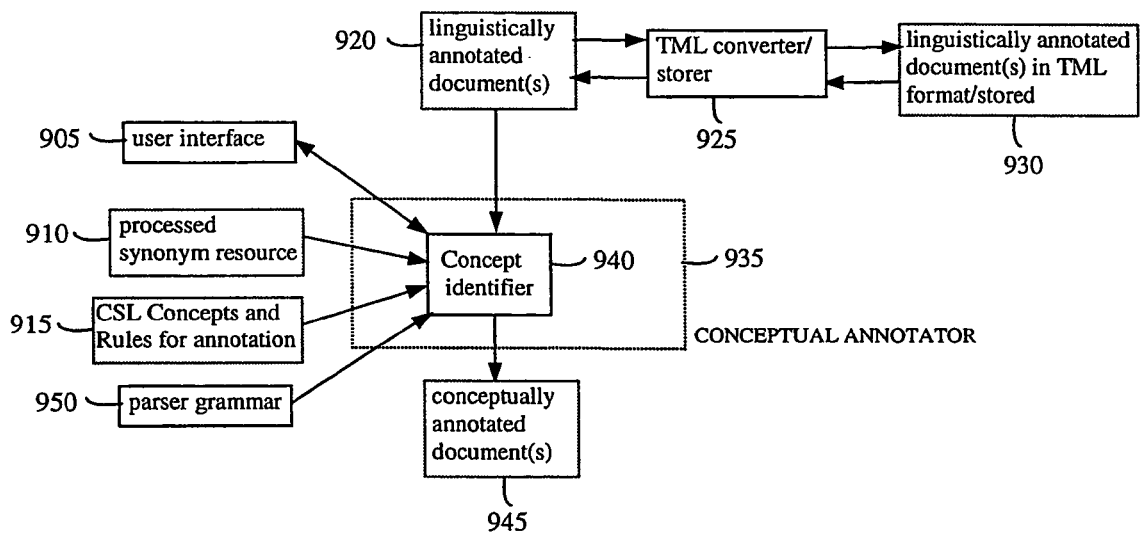
FIG. 9 is a block diagram of the conceptual annotator module shown in FIG. 4.

FIG. 9 is a simplified block diagram of the conceptual annotator 935. The conceptual annotator 935 takes as input linguistically annotated documents 920. The linguistically annotated documents 920 may have been stored 930. The documents may have been stored in TML format 930. If so, the documents need to be converted 925 back into the internal representations output by the parser (820 in FIG. 8).

The conceptual annotator 935 also uses CSL Concepts and Rules for annotation 915 and may also use the parser grammar 950 and synonyms from the processed synonym resource 910. The conceptual annotator 935 outputs conceptually annotated documents 945. An annotated document is a linguistically annotated document augmented with labels identifying the occurrences of Concepts and Concept Rules within the document. The conceptual annotator 935 comprises a Concept identifier 940.

2.3.9. Concept Identifier

Figure 10:
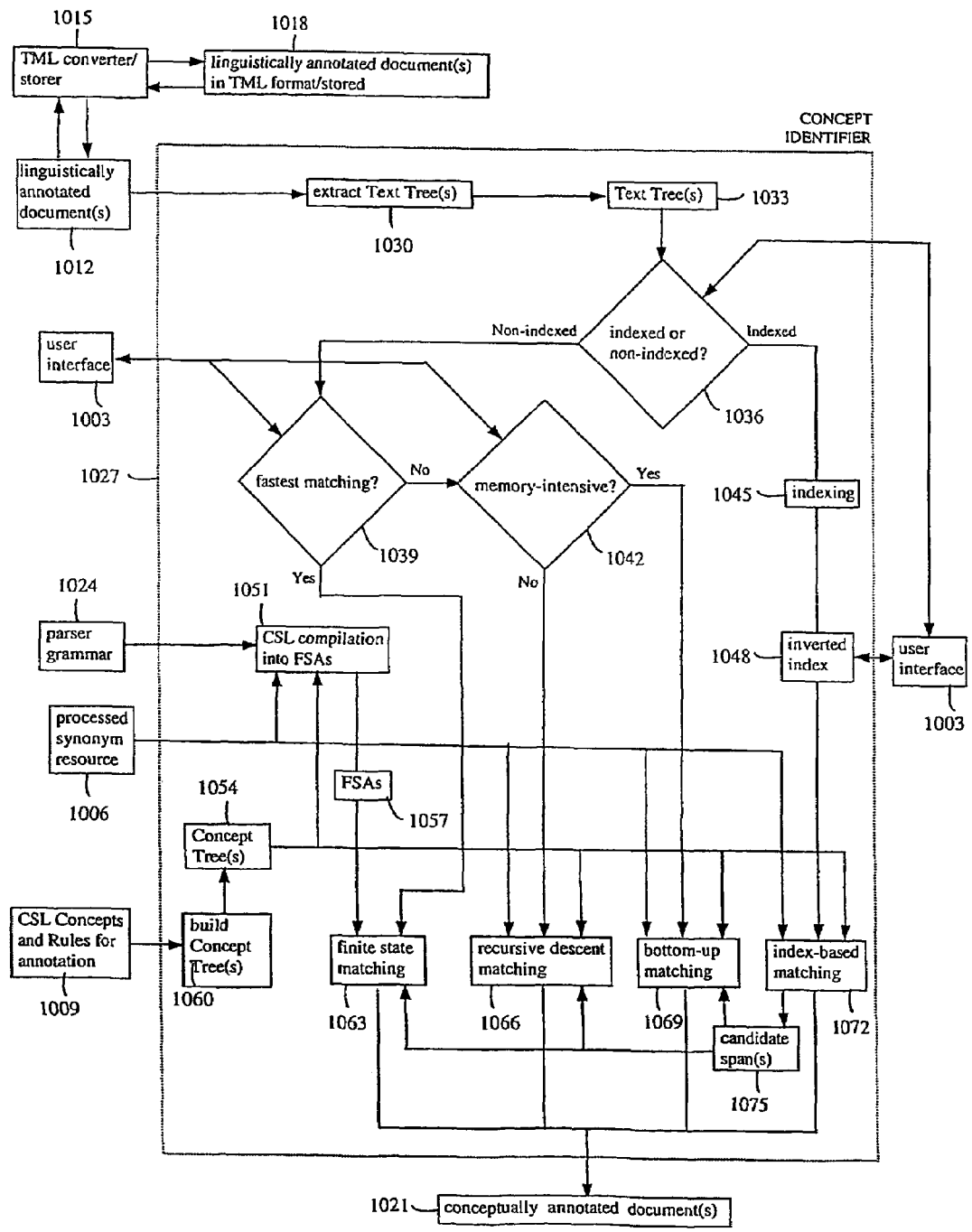
FIG. 10 is a block diagram of the Concept identifier module shown in FIG. 9.

FIG. 10 is a simplified block diagram of the Concept identifier 1027. The Concept identifier 1027 outputs conceptually annotated documents 1021, which are linguistically annotated documents 1012 augmented with the location of Concepts and Concept Rules in the text of those documents.

Four different techniques are used for concept identification: finite state matching 1063, recursive descent matching 1066, bottom-up matching 1069, and index-based matching 1072. Which technique is used depends on (1) whether it is desirable to use linguistically annotated documents 1012 that are indexed or non-indexed 1036, (2) the importance of speed of matching 1039, (3) the availability of memory resources 1042, and (4) the expected amount of backtracking.

Input to the Concept identifier 1027 and to all four techniques is linguistically annotated documents 1012, the processed synonym resource 1006, and CSL Concepts and Rules for annotation 1009. Additionally, the grammar from the (partial) parser 1024 is used in finite state matching 1063 and an inverted index 1048 is used in index-based matching 1072.

The four techniques are described below by explaining how they match a single-term Pattern A, and the operators A Precedes B, A Dominates B, A OR B, and A AND NOT B.

If the data to be matched is non-indexed, then available techniques include, but are not limited to: finite state matching 1063, recursive descent matching 1066, and bottom-up matching 1069. Their use of linguistically annotated documents 1012, the processed synonym resource 1006, and CSL Concepts and Rules for annotation 1009 is described. A worked example is given for the text the cat chased the dog.

The speed, space requirements and need of backtracking of the different techniques are discussed in their respective subsections.

The following common definitions are assumed throughout the descriptions of the Concept identifier 1027 and the four Concept identification techniques. A "word" is defined as an annotated word or other annotated token that is associated with the text of one or more linguistically annotated documents 1012. A "constituent" is a syntactic construct such as a noun phrase, which can be represented via a tag or other label. For example, the constituent "noun phrase" might be represented with a tag called NX. Constituents may be found in linguistically annotated documents 1012.

Figure 11:
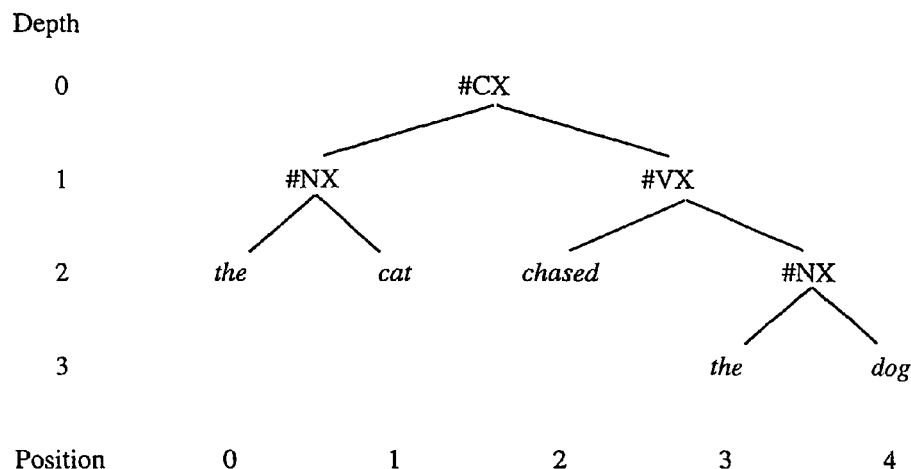
FIG. 11 is a simplified Text Tree for the cat chased the dog.

A "text" is a sequence of words ordered according to the original text of one or more linguistically annotated documents 1012. A "Text Tree" 1033 is an internal representation, a data structure that implicitly or explicitly contains words and constituents and linguistic relations between them as described in one or more linguistically annotated documents 1012. Text Trees 1033 are extracted 1030 from linguistically annotated documents 1012. FIG. 11 shows a simplified Text Tree 1033 for the text the cat chased the dog.

The term "position" refers to a position of a word or constituent in a text. Using the Text Tree 1033 in FIG. 11 as an example, the integer 0 represents the position of the first word the in the text, 1 represents the position of the word cat, and so forth.

The term "interval" refers to a consecutive sequence of words in a text. An interval can be represented in various ways, for instance, as two integers separated by a dash, where the first integer is the start position; and the second integer is the end position. For example, in the Text Tree 1033 in FIG. 11, cat occupies 1-1, and the cat occupies 0-1.

The term "depth" refers to the depth of a word or operator in a representation of text such as a Text Tree 1033. In FIG. 11, for example, the cat and chased have a depth of 2, whereas the dog has depth 3.

A "span" is a word or constituent, or alternatively, a set of words and constituents that follow each other, plus (optionally) some structural information about the word(s) and constituent(s). Such structural information includes, but is not limited to, position, interval, or depth information. A span can be represented in various ways, for instance, by integers or by other means. Again using the Text Tree 1033 in FIG. 11 as an example, the span of the cat is the interval 0-1 and depth 2.

The inverted index 1048, which is used in index-based matching 1072, contains words, constituents, and tags for structural information (e.g., NX) from the linguistically annotated documents 1012 and their spans.

A "Concept Tree" 1054 is a data structure that represents Concepts, Concept Rules and CSL Expressions and their sub-expressions and their relationships. Concept Trees 1054 are built 1060 from CSL Concepts and Rules for annotation 1009.

Figure 12:
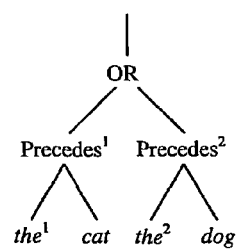
FIG. 12 is a simplified Concept Tree for the Concept Animal containing the Concept Rules "the$^1$ Precedes$^1$ dog" and "the$^2$ Precedes$^2$ cat"

Building Concept Trees 1060 takes as input CSL Concepts and Rules for annotation 1009. Each Concept and Rule is represented as a Concept Tree 1054. Build Concept Trees 1060 checks through each tree representation for Concepts. It expands out each Concept into a series of disjunctions, represented in tree form. For example, build Concept Trees 1060 will take a Concept "Animal" that consists of two Rules Concept:
Concept Rule1: "the Precedes cat"
Concept Rule2: "the Precedes dog"

and translates the Concept into the Concept Tree 1054 shown in FIG. 12.

For the purposes of simpler explanation, Concept Rules are often treated as CSL Expressions that are associated with them. Similarly, Concepts are treated as CSL Expressions that represent disjunctions of their Concept Rules.

2.3.9.1. Finite State Matcher

Finite state matching 1063 takes as input finite state automata (FSAs) 1057 and Text Trees 1033 and produces as output conceptually annotated documents 1021.

While finite state matching 1063 provides the fastest matching with no backtracking, there is a trade-off between processing time and storage space. Before finite state matching 1063 can be performed, Concept Trees 1054 must first be compiled into finite state automata (FSAs) 1057. Concept Tree compilation into FSAs 1051 uses considerable storage space.

CSL compilation into FSAs 1051 uses as input Concept Trees 1054 and the processed synonym resource 1006. It may also use the grammar of the (partial) parser 1024.

CSL compilation into FSAs 1051 is now explained for a single-term pattern A, and the operators A Precedes B, A Dominates B, A OR B, and A AND NOT B. FSAs for these patterns and operators are shown in FIG. 13 through FIG. 18 below. The FSA generated are non-deterministic. There is no mapping for the AND NOT operator given its current definition.

Each CSL Concept is made up of a number of disjunctive rules, each comprising of a single CSL Expression. These are compiled separately and then added together and simplified using standard FSA techniques. This yields a single FSA representing the Concept.

FSA consist of a number of states and transitions. There is one start state from where the FSA begins, indicated by a circle with an "S". There may be multiple end states, indicated by a circle with an "E", which are the states the automaton must reach in order to succeed.

Traversing transitions consumes input and changes the current state. The transition label "*" will match any input. The label "~WORD" will match any word other than WORD. "~CONSTITUENT" will match anything other than the constituent marker CONSTITUENT.

Figure 13:
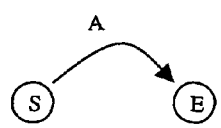
FIG. 13 is a block diagram of the finite state automata for the single-term Pattern A.

Compilation of a single-term Pattern A produces the FSA shown in FIG. 13. The pattern A is a terminal node in a Concept Tree 1054, where A can be either a word alone or a word and a part-of-speech tag. The FSA has transitions that match a word (or a word and a part-of-speech tag) only if it satisfies all the constraints imposed by the pattern A.

Figure 14:
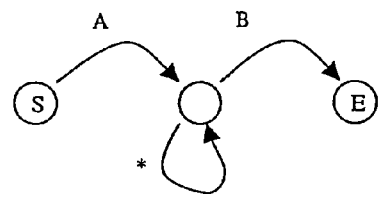
FIG. 14 is a block diagram of the finite state automata for A Precedes B.

Compilation of A Precedes B produces an FSA shown in FIG. 14, but only when there is no dominance within a Concept Tree 1054. Each sub-term (A and B) is mapped recursively.

Compilation into FSAs of the Dominates operator is only possible with an actual Concept Tree 1054. When there is a dominance operation in the CSL Expression, all productions of the dominating constituent are taken from the partial parser grammar 1024. The CSL Expression is then matched against these productions. This gives possible values and placements for constituent markers as well as the expression being dominated. Multiple FSA will be produced depending on the number of productions and possible CSL matches. The FSA produced are portions of the partial parser grammar 1024, converted from regular expressions into FSA, instantiated with the CSL that needs to be matched.

To demonstrate the compilation of the Dominates operator into FSAs, let us assume that the CSL Expression VX dominates dog is one of the CSL Concepts and Rules for annotation 1009. Build Concept Trees 1060 builds the Concept Tree 1054 for this CSL Expression. That Concept Tree 1054 is shown in FIG. 15.

Let us also assume that the (partial) parser grammar 1024 contained the following rules:

VX=verb NX
NX=noun

Figure 15:
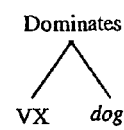
FIG. 15 is a simplified Concept Tree for the Concept "VX Dominates dog"
Figure 16:
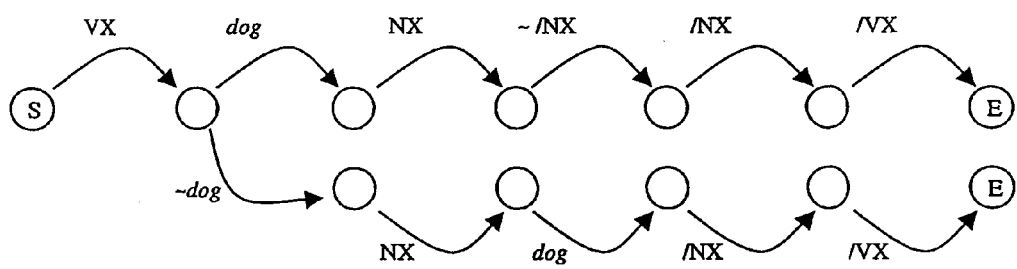
FIG. 16 is a block diagram of the finite state automata for "VX Dominates dog"

Compilation of A Dominates B for these grammar rules 1024 and the Concept Tree 1054 shown in FIG. 15 produces the FSA shown in FIG. 16.

Figure 17:
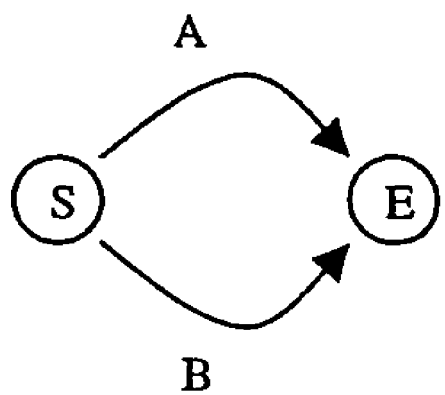
FIG. 17 is a block diagram of the finite state automata for A OR B.
Figure 18:
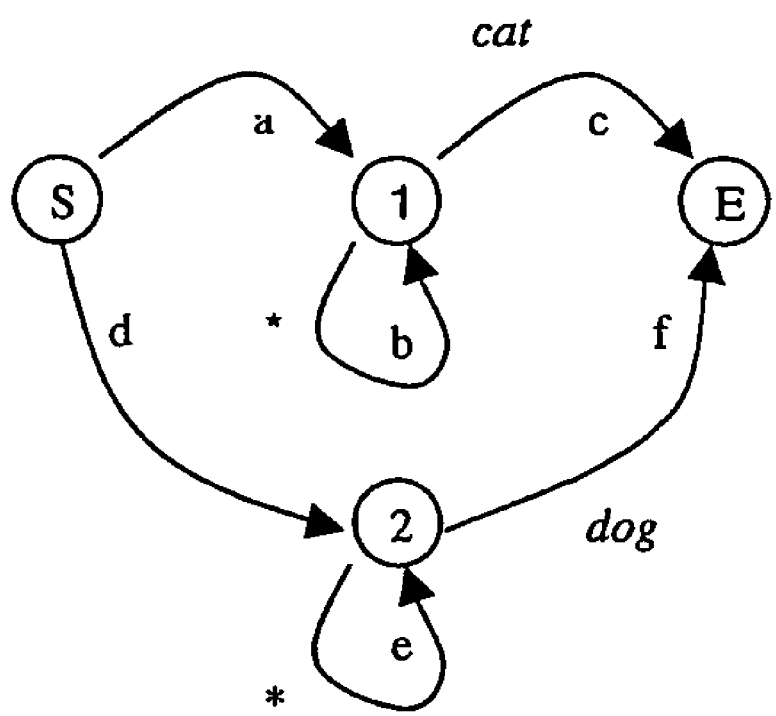
FIG. 18 is a block diagram of the finite state automata for Concept Animal containing the Concept Rules "the$^1$ Precedes$^1$ dog" and "the$^2$ Precedes$^2$ cat"

Compilation of A OR B produces an FSA shown in FIG. 17, but only when there is no dominance within a Concept Tree 1054. Each subterm (A and B) is mapped recursively.

Compilation of the AND NOT operator is not possible.

The resulting FSAs can be simplified using standard FSA techniques that are widely known. The process for traversing a finite state machine (given some text as input) uses standard finite state techniques as implemented in Van Noord, G., *FSA6 Reference Manual* (2000).

Matching occurs by taking the automata for the concepts to be considered and feeding them a flattened Text Tree 1033.

To see how finite state matching 1063 works, consider how the Text Tree 1033 of FIG. 11 is matched against the Concept Tree 1054 of FIG. 12. The Concept Tree 1054 is compiled into the FSA shown in FIG. 16.

The Text Tree 1033 is flattened to:

CX #NX the cat/NX #VX chased #NX the dog/NX/VX/CX

The next step is to start feeding the automata until it is able to continue with each word from the flattened text tree. Table 2 shows how input is consumed by traversing the transitions to reach the end state E, signifying success.

TABLE 2

| State | Transition | Input |
| --- | --- | --- |
| S | — | #CX #NX the cat /NX #VX chased #NX the dog /NX /VX /CX |
| S | — | #NX the cat /NX #VX chased #NX the dog /NX /VX /CX |
| S | A | the cat /NX #VX chased #NX the dog /NX /VX /CX |
| 1 | C | cat /NX #VX chased #NX the dog /NX /VX /CX |
| E | — | |

2.3.9.2. Recursive Descent Matcher

The advantages of the recursive descent matcher over other matchers include relative simplicity and small space requirements. However, there is a possibility of nontrivial amount of backtracking for certain Concepts.

The recursive descent matcher 1066 takes as input one or more Concept Trees 1054, one or more Text Trees 1033, and the processed synonym resource 1006.

Given a CSL Expression from the Concept Tree 1054, a Text Tree 1033, and a position in the text, the recursive descent matching algorithm 1066 can determine whether the CSL Expression matches the text at the given position. It can also determine the span of words that match the CSL Expression. Recursive descent matching 1066 is now explained for a single-term Pattern A, and the operators A Precedes B, A Dominates B, A OR B, and A AND NOT B.

Single-term Pattern A matches at the position if there is a word or a constituent at the position that satisfies all the constraints imposed by the pattern A.

A Precedes B matches at the position if A matches at the position and B matches at a position that follows A. The spans of A and B must not overlap, but can be non-contiguous.

A Dominates B matches at the position if B matches at the position that is within the text spanned by the subtree of A.

A OR B matches at the position if A matches at the position or B matches at the position.

A AND NOT B matches at the position if A matches at the position and B is not found within the span of A.

For an example of how recursive descent matching 1066 works, consider how the Text Tree 1033 of FIG. 11 is matched against the Concept Tree 1054 of FIG. 12.

The recursive descent matcher 1066 attempts to match a given Concept at each position in the text.

At position 0 (the first instance of the word the), the matcher 1066 traverses the Concept Tree 1054 in a top-down fashion. It first encounters the OR operator. It then checks the first sub-expression of OR, which is the Precedes[1] operator. For this operator, the matcher checks its first sub-expression, which is the single-term pattern the[1], against the Text Tree 1033. Since the[1] succeeds, the matcher checks the second sub-expression (the single-term pattern cat) against the Text Tree 1033, temporarily incrementing the position in the text. It finds the word cat, so the Precedes$^1$ operator succeeds. Since the first sub-expression of the OR operator has succeeded, there is no need to check the second, and the Concept Tree 1054 (and hence the Concept as a whole) succeeds. Each successful node in the Concept Tree 1054 records the span that it matched to the node above it, so the overall result is the span the cat.

The recursive descent matcher 1066 now increments the text position to position 1, which is the position of the word cat. The matcher goes through the Concept Tree 1054 until it hits the single-term pattern the$^1$, which doesn't match against the Text Tree 1033. Then the matcher 1066 tries the other branch of the OR until it also hits the single-term pattern the$^1$, which doesn't match against the Text Tree 1033, so the match fails at position 1. The matcher 1066 also fails at position 2.

Similarly at position 2 (the word chased) the word the is not found, so the match fails. However, at position 3 the first branch of the OR fails, but the second branch returns the span the dog. The matcher 1066 works in similar fashion through the remainder of the Text Tree 1033, but no more matches are found.

2.3.9.3. Bottom-Up Matcher

The advantage of the bottom-up matcher 1069 is its ability to produce all solutions in a reasonable memory space without backtracking.

The bottom-up matcher 1069 takes as input one or more Concept Trees 1054, one or more Text Trees 1033, and the processed synonym resource 1006.

The matcher 1069 computes spans consumed by single-term patterns and spans consumed by operators from a Concept Tree 1054 in a bottom-up fashion.

For each single-term Pattern A, the algorithm computes the spans that match the pattern by consulting the Text Tree 1033 and selecting spans that satisfy all the constraints imposed by the pattern. Table 3 shows mappings built between single-term Patterns in the Concept Tree 1054 of FIG. 12 and spans for the words of the Text Tree 1033 of FIG. 11.

TABLE 3

| Single-term pattern in Concept Tree | Spans of words in Tex Tree |
| --- | --- |
| the$^1$ | interval 0-0, depth 2; interval 3-3, depth 3 |
| cat | interval 1-1, depth 2 |
| the$^2$ | interval 0-0, depth 2; interval 3-3, depth 3 |
| dog | interval 4-4, depth 3 |

For every operator, the bottom-up matcher 1069 builds indices representing the spans of text consumed by that operator. Because the matcher 1069 works in a bottom-up fashion, each operator knows the spans of its arguments. Given spans for their arguments A and B, the spans for different operators can be computed as follows.

A Precedes B. For every pair of spans from A and B, such that the span from A precedes the span from B, output a span that spans the both spans. Set the depth to be the minimum of the two.

A Dominates B. For every pair of spans from A and B, such that the span from A overlaps at a lesser depth than the span from B, output the span from B. For example, in the Text Tree 1033 of FIG. 11, #CX (interval 0-4, depth 0) dominates #VX (interval 2-4, depth 1).

A OR B. For A and B, output every span that is a span of A or of B.

A AND NOT B. Select all spans from A such that there is no span in B that would be overlapped by the span from A.

The general bottom-up computation can be enhanced with a (possibly) top-down passing of constraints between CSL Expressions. The constraints can be used to limit the number of matches returned and thus to provide more efficient computation.

Table 4 shows mappings built between operators in the Concept Tree 1054 of FIG. 12 and spans for the operators in the Text Tree 1033 of FIG. 11.

TABLE 4

| Operators in Concept Tree | Spans in Text Tree |
| --- | --- |
| Precedes$^1$ | interval 0-1, depth 2 |
| Precedes$^2$ | interval 3-4, depth 3; interval 0-4, depth 2; interval 0-4, depth 2 |
| OR | interval 0-1, depth 2; interval 3-4, depth 3 |

The bottom-up matcher 1069 matches the Concept Tree 1054 against the Text Tree 1033 in the following manner. The matcher 1069 combines the spans for the single-term Pattern the$^1$ with the spans for the single-term Pattern cat to obtain the spans for Precedes$^1$ operator corresponding to the$^1$ Precedes$^1$ cat. The matcher 1069 considers possible pairs of spans where the first span comes from the spans of the$^1$ and the second span comes from the spans of cat. The possible pairs are <interval 0-0, depth 2; interval 1-1, depth 2> and <interval 3-3, depth 3; interval 1-1, depth 2>. Only the first pair of spans <interval 0-0, depth 2; interval 1-1, depth 2> satisfies the condition that the first span precedes the second span. The spans from the pair are combined together to produce a single span <interval 0-1, depth 2> as recorded in Table 4. Similarly, the spans for the$^2$ are combined with spans for dog to produce the spans for the Precedes$^2$ operator in the$^2$ Precedes$^2$ dog. The spans for the OR operator are computed as a union of the spans for the two Precedes operators. The results are again shown in Table 4.

2.3.9.4. Index-Based Matcher

Figure 19:
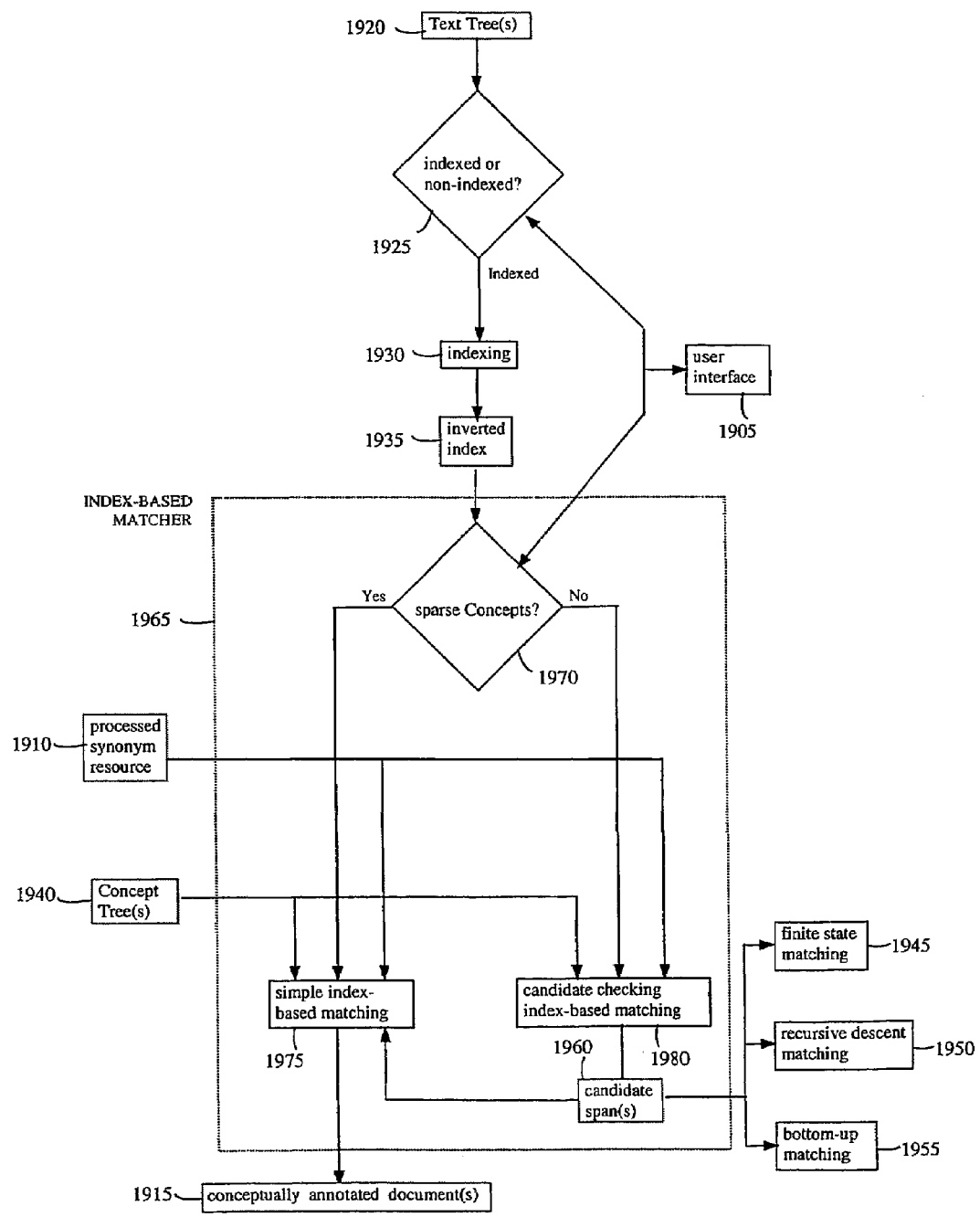
FIG. 19 is a block diagram of the index-based matcher module shown in FIG. 10.

FIG. 19 is a simplified block diagram of the index-based matcher 1965. The index-based matcher 1965 takes as input one or more Concept Trees 1940 and the processed synonym resource 1910. The index-based matcher 1965 also takes as input an inverted index 1935 of one or more Text Trees 1920.

An inverted index 1935 contains spans of each word and constituent (e.g., noun phrase) in a Text Tree 1920. Consider the text the cat chased the dog and its Text Tree 1920 shown in FIG. 11. Table 5 shows an inverted index for that Text Tree 1920.

TABLE 5

| Words and constituents | Spans of words and constituents |
| --- | --- |
| #CX | interval 0-4, depth 0 |
| #NX | interval 0-1, depth 1; interval 3-4, depth 2 |
| #VX | interval 2-4, depth 1 |
| the | interval 0-0, depth 2; interval 3-3, depth 3 |
| cat | interval 1-1, depth 2 |
| chased | interval 2-2, depth 2 |
| dog | Interval 4-4, depth 3 |

The index-based matcher 1965 is faster than matchers that use parse tree-like representations of the linguistically annotated documents.

When Text Trees 1920 are indexed, there remains a choice of at least two index-based matching techniques, depending on the sparseness of Concepts 1970. The sparseness of Concepts 1970 affects the speed of matching. Candidate checking index-based matching 1980 seems to be faster for sparsely occurring Concepts, whereas simple index-based matching 1975 seems to be faster for densely occurring Concepts. (Note that it would be straightforward to build an index-based finite state matcher 1063 and an index-based recursive descent matcher 1066, though we have not elected to do so.)

2.3.9.4.1. Simple Index-Based Matcher

The simple index-based matcher 1975 traverses the Concept Tree 1940 in a recursive depth-first fashion, using backtracking to resolve the constraints of the various CSL operators, until all matches are produced for the items of the Concept Tree 1940 against the text in the inverted index 1935. Familiarity with the techniques of recursion and backtracking is a necessary prerequisite for understanding this algorithm.

Each node in the Concept Tree 1940 maintains a state that is used to determine whether or not it has been processed before in the match of the Concept Tree 1940 against the inverted index 1940, and also relevant information about the progress of the match.

The state of nodes for single-item patterns that are words includes the following information: a list of applicable synonyms of the word in question, and the current synonym being used for matching; an iterator into the inverted index 1940 that can enumerate all instances of the word in the index 1940, and which records the current word.

Nodes for single-term Patterns that are tags and constituents simply maintain iterators into the index, which record the particular instance of the tag or constituent node being used for the current match.

Nodes for Precedence, Dominance, OR and AND NOT operators all record which of their operands have been tried and have been successful in the current match.

During the course of a match, each node is tested, and if successful, returns a set of spans covering the match of its corresponding CSL sub-expression (i.e., all nodes below that node in the Concept Tree 1940).

To understand how simple index-based matching 1975 proceeds, consider again the text the cat chased the dog and its Text Tree 1920 shown in FIG. 11. The simple index-based matcher 1975 uses the inverted index 1935 for Text Tree 1920. This inverted index 1935 for Text Tree 1920 is shown in Table 5.

Table 6 shows the span information that the inverted index 1935 has already recorded for those words in Text Tree 1920 shown in FIG. 11.

TABLE 6

| Words | Spans of words |
|---|---|
| the | interval 0-0; interval 3-3 |
| cat | interval 1-1 |
| chases | interval 2-2 |
| dog | interval 4-4 |

The match begins at the OR operator. The matcher notes that none of the operands have been tried before in the current match, so it picks the first one, a Precedes[1] operator. The matcher notes that the first operand of Precedes[1] has not been tried in this match, so it tries it. The node for the word the notes that it has never before been processed, so it initializes its iterator into the inverted index 1935, and returns a successfully matched span at 0-0. The matcher then processes the second operand of the Precedes[1] operator. This is the word cat, and it is successful at 1-1. The matcher then makes sure that the spans returned from the operands satisfy the constraints of a precedence relationship, namely that the first span should precede the second. In this case, the constraints are satisfied, so the Precedes[1] operator is successful with the span 0-1. The OR operator succeeds immediately, since only one of its operands need match, and returns 0-1 as well. Thus the entire match succeeds with the span 0-1.

Then the matcher backtracks. Upon backtracking, the matcher proceeds down the Concept Tree 1940 immediately to the last node it tried—the word cat. Upon backtracking, the word node attempts to increment its iterator. Since there are no more instances of the word cat in the index, the node fails. The Precedes[1] node then backtracks through its first operand, which is the word the. When the word node increments its iterator, it finds the second instance of the word the, at 3-3. Then the Precedes[1] node tries its second operand again, whereupon it fails. It then backtracks yet again through its first operand. Since there are no more instances of the word the, the word node fails, and the Precedes[1] node finally fails as well. Since the Precedes[1] node has failed, the OR operator tries its other operand. Matching proceeds as above until the second match (at 3-4) is found. Upon further backtracking all the iterators are exhausted and there are no more matches to be found.

2.3.9.4.2. Candidate Checking Index-Based Matcher

The candidate checking index-based matcher 1980 has two parts. The first part identifies candidate spans 1960 that might, but do not necessarily contain, a Concept match. The second part produces (possibly empty) set of matches within the candidate span.

Identifying a candidate span. The purpose of identifying candidate spans 1960 is to weed out pieces of text that cannot contain a Concept match.

A candidate span 1960 is a span that can overlap one or more matches. A candidate span can be as large as the whole text from a single document. The matcher 1980 splits up such a text into smaller texts of a manageable size. For example, the matcher 1980 would split the text The cat chased the dog. John loves Mary. Peter loves Sandra.

Into the following candidate spans 1960: The cat chased the dog (span 0-4), John loves Mary (span 5-7) and Peter loves Sandra (span 8-10). (Note that the numbers in these spans ignore the full stops at the end of each sentence.). The iterators introduced in the example below would generate the span 0-4 as the candidate span 1960. However, spans 5-7 and 8-10 would not be generated as candidate spans 1960.

Consider, as another example, the Concept Tree 1940 in FIG. 12. Using candidate spans 1960 that correspond to documents, it might be useful to constrain the expensive matching for the Concept Animal to only those documents that contain words the and cat or that contain words the and dog. This will save the cost of matching on documents that can never satisfy the matching constraints, because, for example, they do not contain the words cat or dog.

Each CSL sub-expression from the Concept Tree 1940 is associated with an Iterator. Iterators can be used to generate candidate spans or check whether a given span is a candidate span. The pieces of text that are not covered by any of the generated candidate spans are guaranteed to not contain matches.

Iterators behave differently with different kinds of CSL Expressions. One of the possible behaviors for the Iterators is given below.

Single-term Pattern A. The inverted index 38 is used to generate or check candidate spans 1960.

I Precedes I. The only spans returned are those generated as candidate spans 1960 by both Iterators associated with the arguments A and B. Similarly, the only spans checked as candidate spans 1960 are those spans that are also candidate spans 1960 of the Iterators associated with the arguments A and B.

A Dominates B. The behaviour of the Iterator A Dominates B is the same as for A Precedes B.

A OR B. The only spans returned are those generated as candidate spans 1960 by at least one of the Iterators associated with arguments A and B. Similarly, the only spans checked as candidate spans 1960 are those spans that are also candidate spans 1960 of at least one of the Iterators associated with arguments A and B.

A AND NOT B. The only spans returned are those generated as candidate spans 1960 by the Iterator associated with argument A. Similarly, the only spans checked as candidate spans 1960 are those spans that are also candidate spans 1960 of the Iterator associated with argument A.

Consider, for example, how the span is checked that covers the whole Text Tree 1920 for the cat chased the dog in FIG. 11. The OR Iterator succeeds because its first argument, the Precedes[1] Iterator, succeeds when it check its span. The Precedes[1] Iterator succeeds because both of its argument Iterators succeed. Those argument Iterators are the the[1] Iterator and the cat Iterator. The the[1] Iterator succeeds because the input span (for the cat chased the dog) overlaps both of the spans for the[1] from the inverted index 1935 in Table 6. The span for the cat chased the dog is 0-4. The spans for the[1] in the inverted index 1935 are 0-0 and 3-3. The cat Iterator succeeds for the same reason.

Producing a Set of Matches. The candidate checking matcher 1980 can use any of the other Concept identification techniques described previously—FSA matching 1063, recursive descent matching 1066, bottom-up matching 1069, or simple index based matching 1975—or any other possible identification techniques to produce the set of matches.

As an example, consider the use of recursive descent matcher 1066 with the text The cat chased the dog. John loves Mary. Peter loves Sandra.

This text produces the candidate spans 1960 The cat chased the dog (span 0-4), John loves Mary (span 5-7) and Peter loves Sandra (span 8-10).

In its preferred form as described in the Recursive Descent Matcher section (2.3.9.2), the matcher 1066 would try to match the Concept Tree from FIG. 12 to the Text Tree 1920 corresponding to the whole text at every possible position between 0 and 10. However, using the candidate span 1960 information (knowing that matches cannot occur between positions 5-7 and 8-10), recursive descent matching 1066 can be constrained to check the Concept Tree from FIG. 12 only at positions 0, 1, 2, 3 and 4. It is not necessary for the recursive descent matcher 1066 to check positions 5, 6, 7, and 8. Hence, recursive descent matching 1066 can proceed faster.

2.3.10. Synonym Processor

Figure 20:
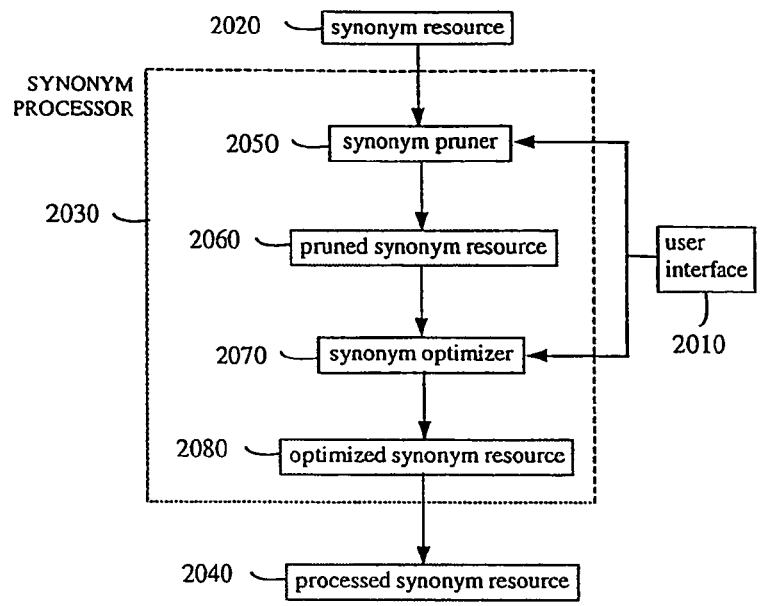
FIG. 20 is a block diagram of the synonym processor module shown in FIG. 2 comprising a synonym pruner and synonym optimizer.
Figure 21:
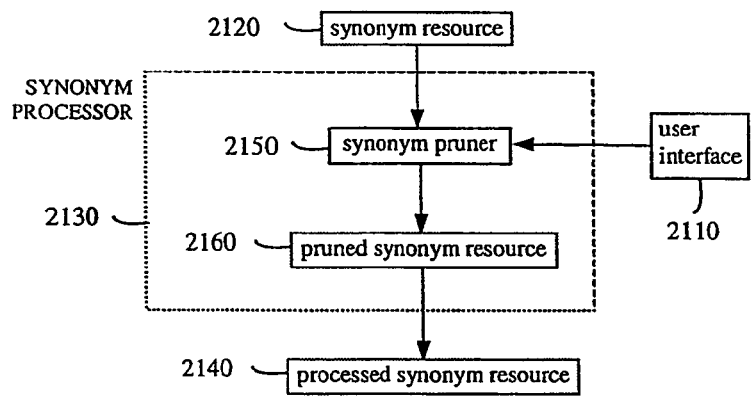
FIG. 21 is a block diagram of the synonym processor module shown in FIG. 2 comprising a synonym pruner.
Figure 22:
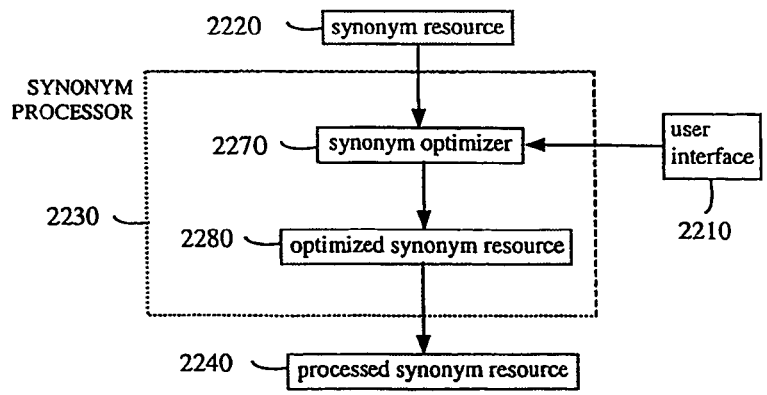
FIG. 22 is a block diagram of the synonym processor module shown in FIG. 2 comprising a synonym optimizer.

FIG. 20, FIG. 21, and FIG. 22 are simplified block diagrams of a synonym processor 2010, 2110, and 2210 in various configurations. The synonym processor 2010, 2110, and 2210 takes as input a synonym resource 2020, 2120, and 2220 such as WordNet, a machine-readable dictionary, or some other linguistic resource. Such synonym resources 2020, 2120, and 2220 contain what we call "synonymy relations." A synonymy relation is a binary relation between two synonym terms. One term is a word-sense; the second term is a word that has a meaning synonymous with the first term. Consider, for example, the word snow, which has several word senses when used as a noun, including a sense meaning "a form of precipitation" and another sense meaning "slang for cocaine." The former sense of snow has a number of synonymous terms including meanings of the words snowfall and snowflake. The latter sense of snow includes meanings of the words cocaine, cocain, coke, and C. Hence, snowfall and snowflake are in a synonymy relation with respect to the noun-sense of snow meaning "a form of precipitation."

FIG. 20 shows the preferred embodiment in which the synonym processor 2030 comprises a synonym pruner 2050 and synonym optimizer 2070. This is the configuration described in Turcato, D., Popowich, F., Toole, J., Fass, D., Nicholson, D., and G. Tisher, "Adapting a Synonym Database to Specific Domains," In Proceedings of the Association for Computational Linguistics (ACL) '2000 Workshop on Recent Advances in Natural Language Processing and Information Retrieval, 8 Oct. 2000, Hong Kong University of Science and Technology, pp. 1-12 (October 2000), (cited hereafter as "Turcato et al. (2000)"), which is incorporated herein by reference. The rest of the description assumes this configuration, except where stated otherwise.

FIG. 21 and FIG. 22 are simplified block diagrams of the synonym processor 2110 and 2210 in two less favoured configurations. FIG. 21 is a simplified block diagram of the synonym processor 2210 containing just the synonym pruner 2250. FIG. 22 is a simplified block diagram of the synonym processor 2210 containing just the synonym optimizer 2280.

2.3.10.1. Synonym Pruner

Figure 23:
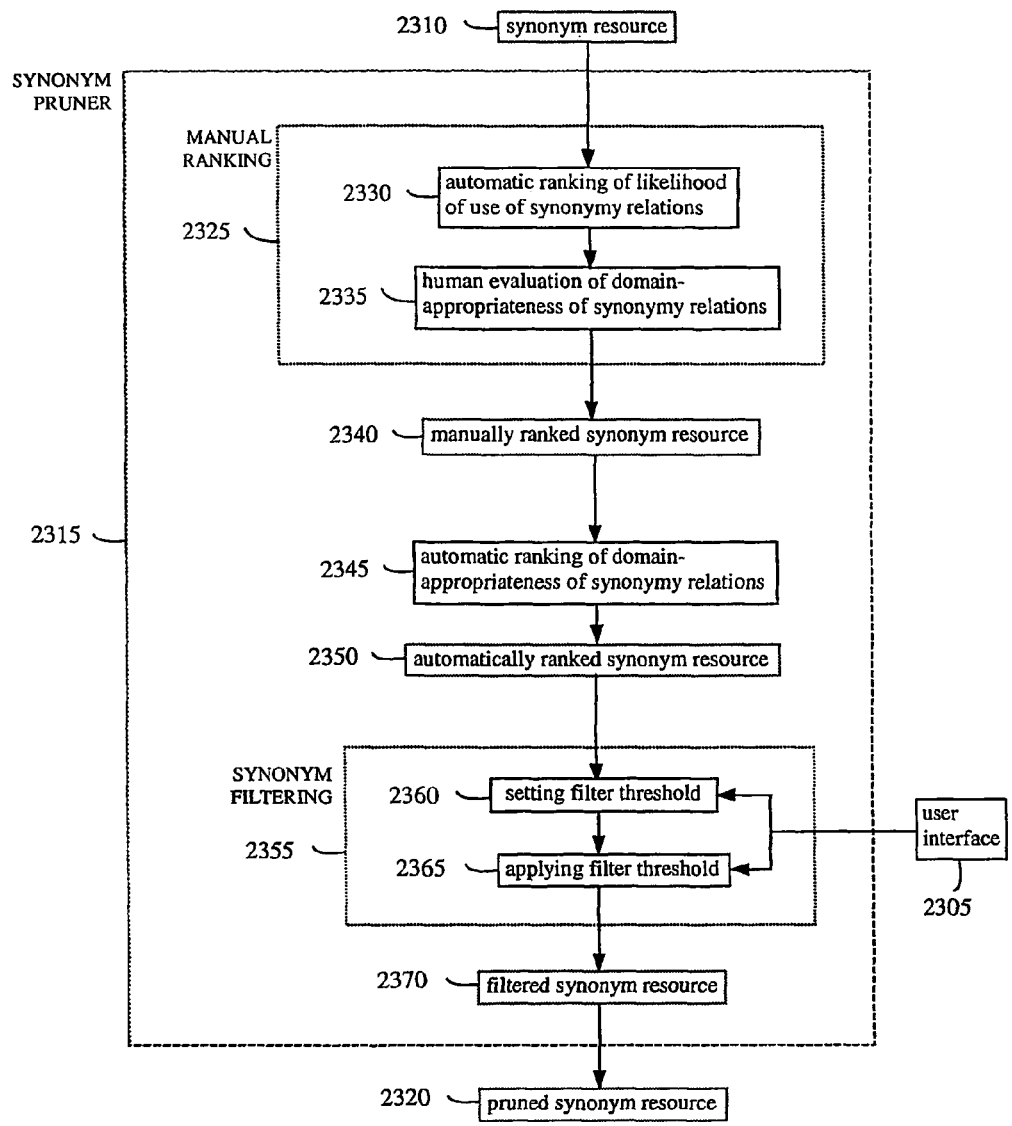
FIG. 23 is a block diagram of the synonym pruner module shown in FIG. 20 and FIG. 21 comprising manual ranking, automatic ranking, and synonym filtering.
Figure 24:
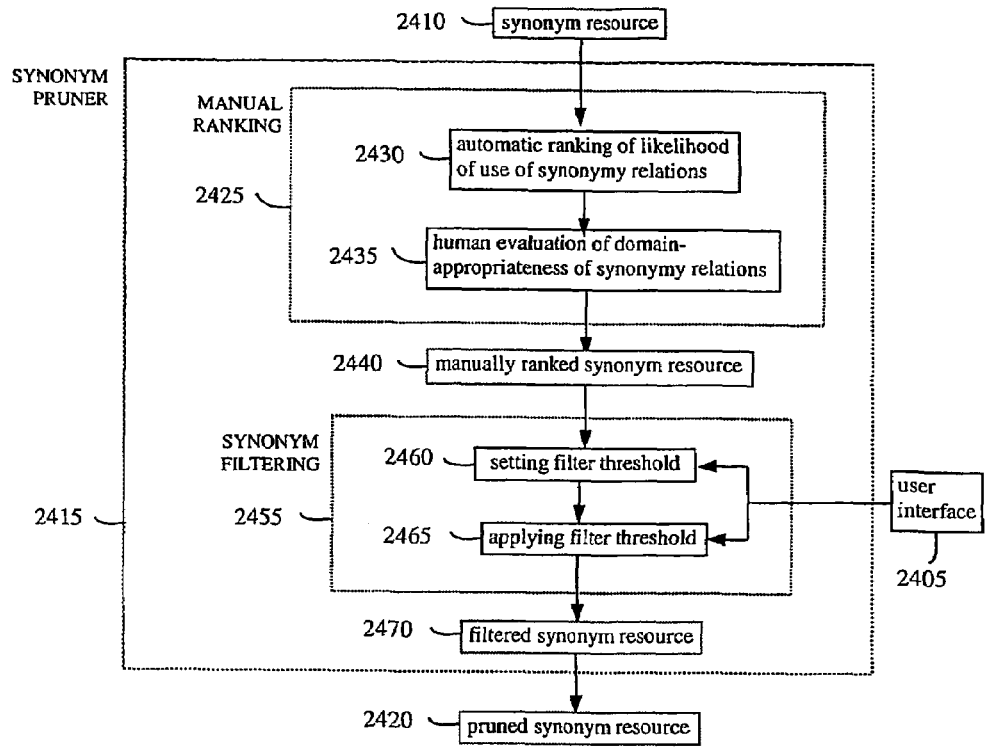
FIG. 24 is a block diagram of the synonym pruner module shown in FIG. 20 and FIG. 21 comprising manual ranking and synonym filtering.
Figure 25:
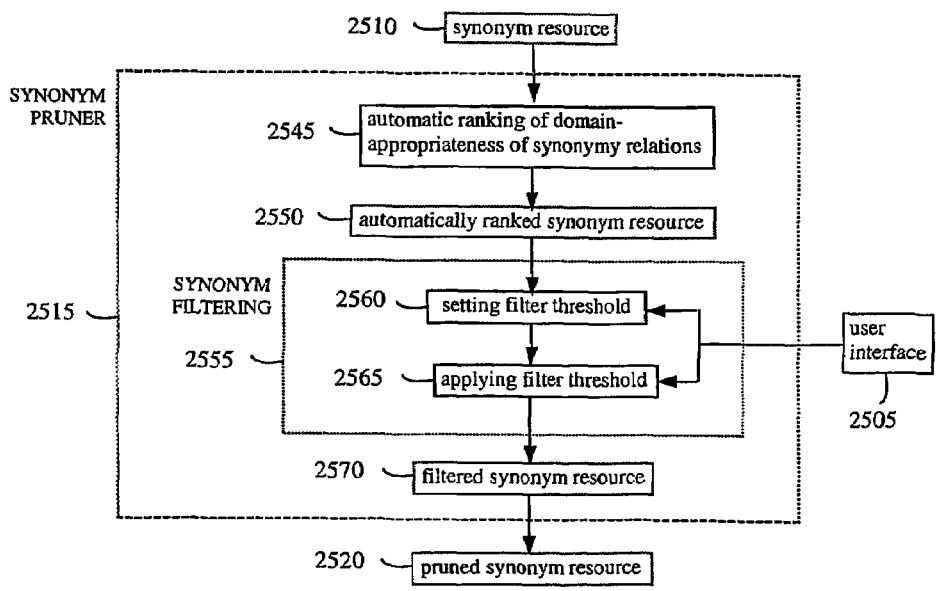
FIG. 25 is a block diagram of the synonym pruner module shown in FIG. 20 and FIG. 21 comprising automatic ranking and synonym filtering.

FIG. 23, FIG. 24, and FIG. 25 are simplified block diagrams of the synonym pruner 2315, 2415, and 2515 in various configurations. The synonym pruner 2315, 2415, and 2515 takes as input a synonym resource 2310, 2410, and 2510 such as WordNet, a machine-readable dictionary, or some other linguistic resource. The synonym pruner 2315, 2415, and 2515 produces those synonymy relations required for a particular domain (e.g., medical reports, aviation incident reports). Those synonymy relations are stored in a pruned synonym resource 2320, 2420, and 2520.

The synonym resource 2310, 2410, and 2510 is incrementally pruned in three phases, or certain combinations of those phases. In the first two phases, two different sets of ranking criteria are applied. These sets of ranking criteria are known as "manual ranking" 2325, 2425, and 2525 and "automatic ranking" 2345, 2445, and 2545. In the third phase, a threshold is set and applied. This phase is known as "synonym filtering" 2355, 2455, and 2555.

FIG. 23 shows the preferred embodiment in which the synonym pruner 2315 comprises manual. ranking 2325, automatic ranking 2345, and synonym filtering 2355. This is the configuration used by Turcato et al. (2000) cited above. The rest of the description assumes this configuration, except where stated otherwise.

FIG. 24 and FIG. 25 are simplified block diagrams of the synonym pruner 2415 and 2515 in two less favoured configurations. FIG. 24 is a simplified block diagram of the synonym pruner 2415 containing just manual ranking 2425 and synonym filtering 2455. FIG. 25 is a simplified block diagram of the synonym pruner 2515 containing just automatic ranking 2545 and synonym filtering 2555.

Figure 25A:
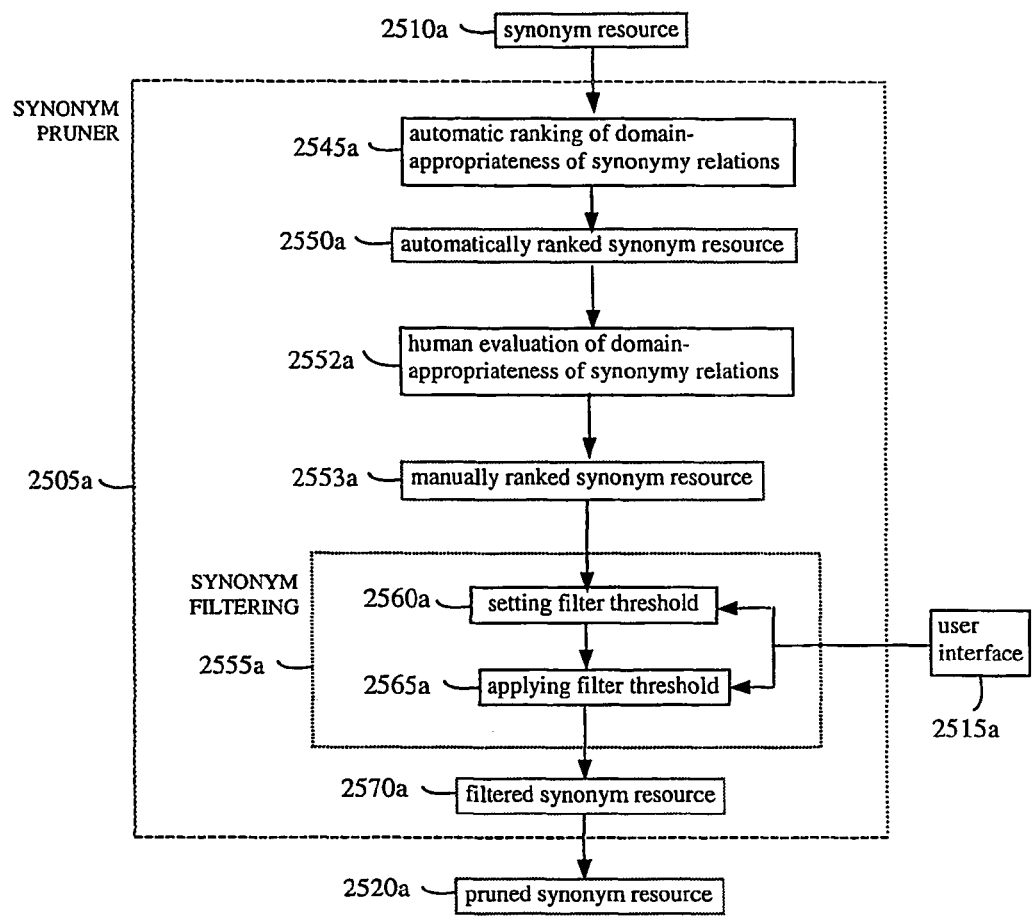
FIG. 25a is a block diagram of the synonym pruner module shown in FIG. 20 and FIG. 21 comprising automatic ranking, human evaluation, and synonym filtering.

A variant of FIG. 25 is FIG. 25a, in which the automatically ranked synonym resource 2550a produced by the human evaluation of domain-appropriateness of synonymy relations queries 2545a is passed to human evaluation of domain-appropriateness of synonymy relations queries 2552a before input to synonym filtering queries 2555a.

The manual ranking process 2325 consists of automatic ranking of synonymy relations in terms of their likelihood of use in the specific domain 2330, followed by evaluation of the domain-appropriateness of synonymy relations by human evaluators 2335.

The automatic ranking of synonymy relations 2330 assigns a "weight" to each synonymy relation. Each weight is a function of the actual or expected frequency of use of a synonym term in a particular domain, with respect to a particular sense of a first synonym term. For example, Table 7 shows weights assigned to synonymy relations in the aviation domain between the precipitation sense of snow and its synonym terms cocaine, cocain, coke, and C.

TABLE 7

| Synonymy relation between precipitation sense of snow and a synonym term | Weight |
|---|---|
| cocaine | 1 |
| cocain | 0 |
| coke | 8 |
| C | 9168 |

One possible method and system (of many possible methods and systems) for the automatic ranking of synonymy relations 2330 that may be used with the present invention is described in section 2.2.1 of Turcato et al. (2000). Where no inventory of relevant prior queries exists for the domain then the ranking may be simply in terms of domain corpus frequency. Where an inventory of relevant prior queries exists, then the ranking uses the frequency of the occurrence of the term in the domain corpus and the inventory of query terms to estimate how often a given synonymy relation is likely to be used.

The set of synonymy relations and their weights are then ranked from greatest weight to least, and then presented in that ranked order to human evaluators for assessment of their domain-appropriateness 2335. The weights are useful if there are insufficient evaluators to assess all the synonymy relations, as is frequently the case with large synonym resources 2310. In such cases, evaluators begin with the synonymy relations with greatest weights and proceed down the rank-ordered list, assessing as many. synonymy relations as they can with the resources they have available.

The judgement of appropriaten ss of synonymy relation in a domain might be a rating in terms of a binary Yes-No or any other rating scheme the evaluators see fit to use (e.g., a range of appropriateness judgements).

The output of manual ranking 2325 is a manually ranked synonym resource 2340. The manually ranked synonym resource 2340 is like the synonym resource 2310, except that the synonymy relations have been ranked in terms of their relevance to a specific application domain. No synonymy relations are removed during this phase.

In the second phase of the preferred embodiment shown in FIG. 23, the manually ranked synonym resource 2340 is automatically ranked 2345. Automatic ranking 2345 is based on producing scores representing the domain-appropriateness of synonymy relations. The scores are produced from the frequencies in a domain-specific corpus of the words involved in the synonymy relation, and the frequencies of other semantically related words. Those words involved in the synonymy relation are presently, but need not be limited to, terms from the lists of synonyms and dictionary definitions for words. Other semantically related words include, but need not be limited to, superordinate and subordinate terms for words.

One possible method and system (of many possible methods and systems) for the automatic ranking of the domain-appropriateness of synonymy relations 2345 that may be used with the present invention is described in section 2.3 of Turcato et al. (2000).

The output of automatic ranking 2345 is an automatically ranked synonym resource 2350 of the same sort as the manually ranked synonym resource 2340, with the ranking scores attached to synonymy relations. Again, no synonymy relations are removed during this phase.

In synonym filtering 2355, a threshold is set 2360 and applied 2365 to the automatically ranked synonym resource 2350, producing a filtered synonym resource 2370. It is during this phase of synonym pruning 2360 that synonymy relations are removed.

The threshold setting 2360 in the preferred embodiment is flexible and set by the user through a user interface 2305, though neither needs to be the case. For example, the threshold could be fixed and set by the system developer or the threshold could be flexible and set by the system developer.

The three phases just described can be configured in ways other than the preferred embodiment just described. Firstly, strictly speaking, automatic pruning 2345 could be performed manually, though it would require many person-hours on a synonym resource 2310 of any size. Second, in the preferred embodiment, the pruned synonym resource 2310 is the result of applying two rounds of ranking. However, in principle, the pruned synonym resource 2320 could be the result of just one round of ranking: either just manual ranking 2425 as shown in FIG. 24 or just automatic ranking 2545 as shown in FIG. 25.

2.3.10.2. Synonym Optimizer

Figure 26:
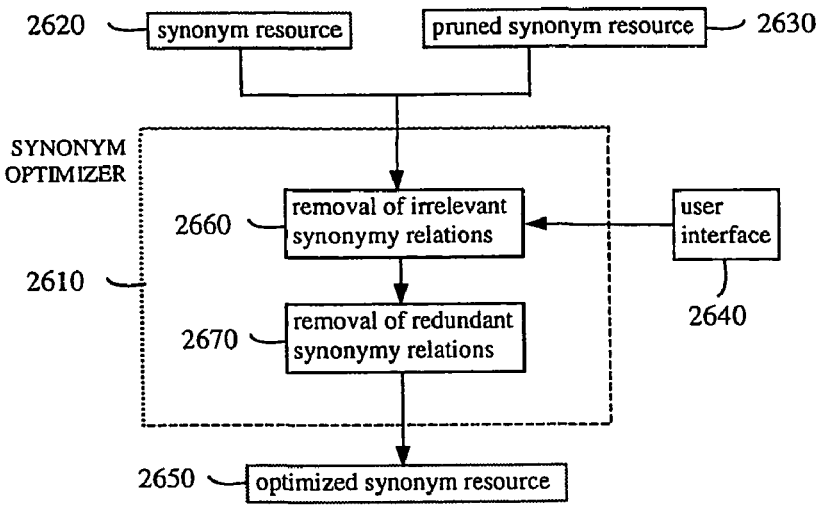
FIG. 26 is a block diagram of the synonym optimizer module shown in FIG. 20 and FIG. 22 comprising removal of irrelevant and redundant synonymy relations.
Figure 27:
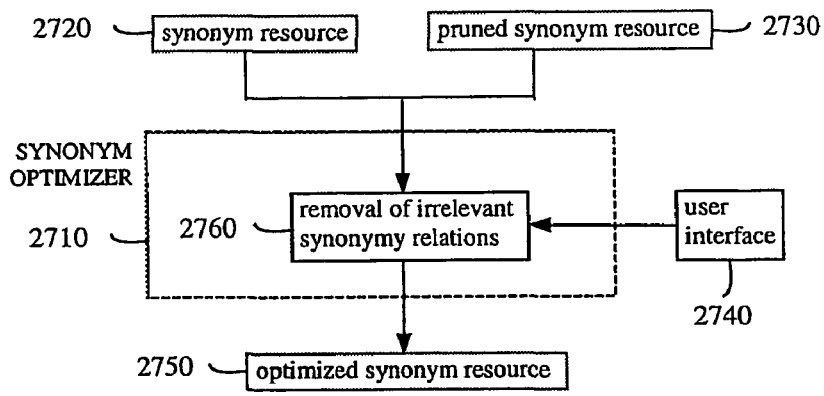
FIG. 27 is a block diagram of the synonym optimizer module shown in FIG. 20 and FIG. 22 comprising removal of irrelevant synonymy relations.
Figure 28:
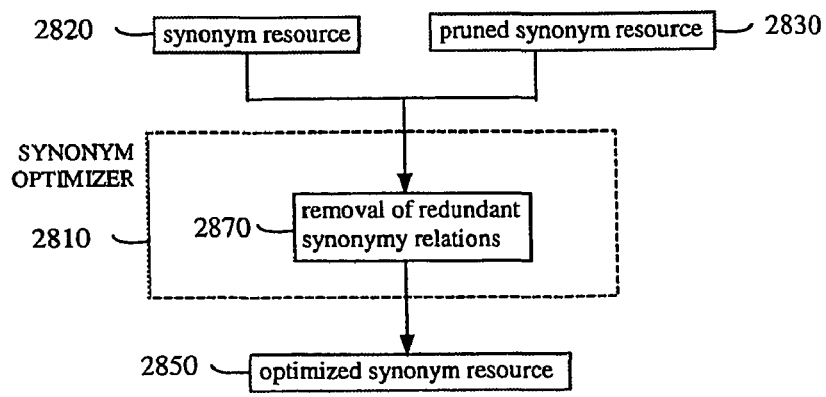
FIG. 28 is a block diagram of the synonym optimizer module shown in FIG. 20 and FIG. 22 comprising removal of redundant synonymy relations.

FIG. 26, FIG. 27, and FIG. 28 are simplified block diagrams of the synonym optimizer 2610, 2710, and 2810 in various configurations. Input to of the synonym optimizer 2610, 2710, and 2810 is either an unprocessed synonym resource 2620, 2720, and 2820 or a pruned synonym resource 2630, 2730, and 2830. The input is a pruned synonym resource 2630, 2730, and 2830 in the preferred embodiment of the synonym processor (shown in FIG. 20). The input is an unprocessed synonym resource 2620, 2720, and 2820 for one of the other two configurations of the synonym processor (shown in FIG. 22).

Output is an optimized synonym resource 2650, 2750, and 2850.

The synonym optimizer 2610, 2710, and 2810 identifies synonymy relations that can be removed that, if absent, either do not affect or minimally affect the behaviour of the system in a specific domain. It consists of two phases that can be used either together or individually. One of these phases is the removal of irrelevant synonymy relations 2660 and 2760; the other is the removal of redundant synonymy relations 2670 and 2870.

FIG. 26 shows the preferred embodiment in which the synonym optimizer 2610 comprises both the removal of irrelevant synonymy relations 2660 and the removal of redundant synonymy relations 2670. This is the configuration used by Turcato et al. (2000). The rest of the description assumes this configuration, except where stated otherwise.

FIG. 27 and FIG. 28 are simplified block diagrams of the synonym optimizer 2710 and 2810 in two less favoured configurations. FIG. 27 is a simplified block diagram of the synonym optimizer 2710 containing just the removal of irrelevant synonymy relations 2760. FIG. 28 is a simplified block diagram of the synonym optimizer 2810 containing just the removal of redundant synonymy relations 2870.

The removal of irrelevant synonymy relations 2660 eliminates synonymy relations that, if absent, either do not affect or minimally affect the behaviour of the system in a particular domain. One criterion for the removal of irrelevant synonymy relations 2660 is: a synonymy relation that contains a synonym term that has zero actual or expected frequency of use in a particular domain with respect to a particular sense of a first synonym term. For example, Table 1 shows weights assigned in the aviation domain for synonymy relations between the precipitation sense of snow and its synonym terms cocaine, cocain, coke, and C. The table shows that the synonym term cocain has weight 0, meaning that cocain has zero actual or expected frequency of use as a synonym of the precipitation sense of snow in the aviation domain. In other words, the synonymy relation (precipitation sense of snow, cocain) in the domain of aviation can be removed.

Note that the criterion for removing a synonym term need not be zero actual or expected frequency of use. When synonym resources are very large, an optimal actual or expected frequency of use might be one or some other integer. In such cases, there is a trade-off. The higher the integer used, the greater the number of synonymy relations removed (with corresponding increases in efficiency), but the greater the risk of a removed term showing up when the system is actually used.

In most cases, users will accept that irrelevant synonym terms are those with zero actual or expected frequency of use. However, the user interface 2640 allows users to set their own threshold for actual or expected frequency of use, should they want to.

A possible method and system (of many possible methods and systems) for the removal of irrelevant synonymy relations 2660 that may be used with the present invention is described in section 2.4.1 of Turcato et al. (2000). In particular, terms which never appear in the domain corpus are considered to be irrelevant. If the domain corpus is sufficiently large, then terms which appear in a low frequency may still be considered to be irrelevant.

The removal of redundant synonymy relations 2670 eliminates redundancies among the remaining synonymy relations. Synonymy relations that are removed in this phase are again those that can be removed without affecting the behaviour of the system.

A possible method and system (of many possible methods and systems) for the removal of redundant synonymy relations 2670 that may be used with the present invention is described in section 2.4.2 of Turcato et al. (2000). In particular, sets of synonyms which contain a single term (namely the target term itself) are removed as are sets of synonyms which are duplicates, namely are identical to another set of synonyms in the resource which has not been removed.

The output of optimization 2610 is an optimized synonym resource 2650, which is of the same sort as the unprocessed synonym resource 2620 and pruned synonym resource 2620, except that synonymy relations that are irrelevant or redundant in a specific application domain have been removed.

Note that optimization 2610 could be used if the only synonym resource to be filtered 2355 was the manually ranked synonym resource 2340 produced by manual ranking 2325 within synonym pruning 2305. Indeed, optimization 2610 would be pretty much essential if manual ranking 2325 and filtering 2355 was the only synonym pruning 2305 being performed. Optimization 2610 could also in principle be performed between manual ranking 2325 and automatic ranking 2345, but little is gained from this because irrelevant or redundant synonymy relations in the manually ranked synonym resource 2340 do not affect automatic pruning 2345.

2.3.11. CSL Processor

Figure 29:
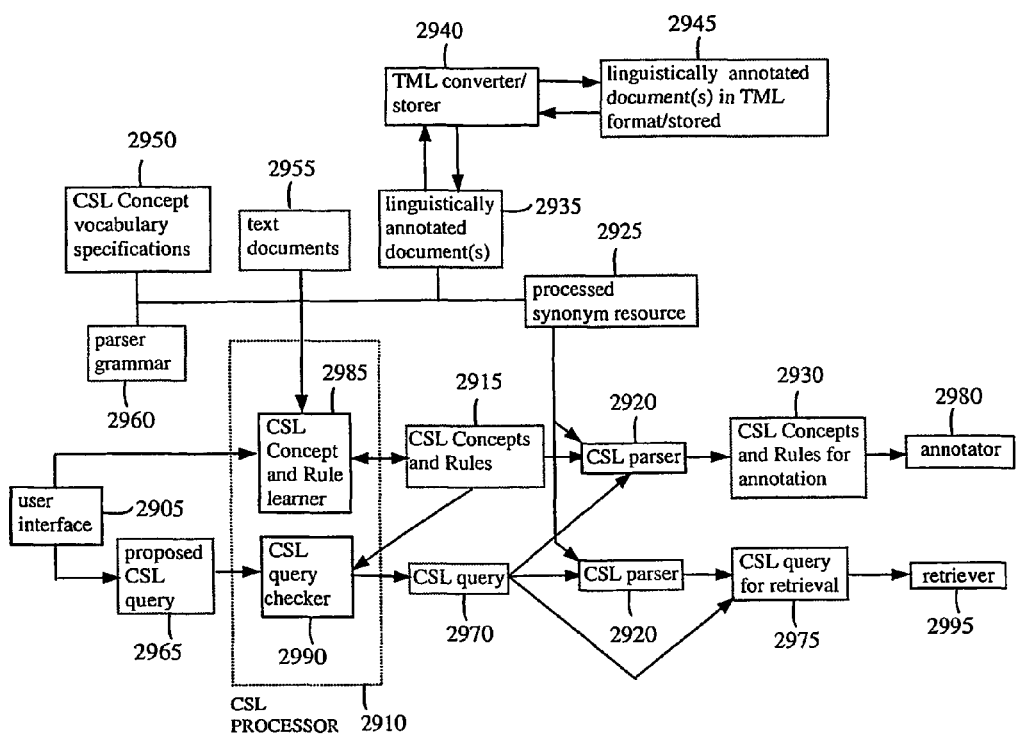
FIG. 29 is a block diagram of the CSL processor module shown in FIG. 2.

FIG. 29 is a simplified block diagram of the CSL processor 2910. The CSL processor 2910, accessed by the user interface 2905, comprises a CSL Concept and Concept Rule learner 2985 and a CSL query checker 2990.

2.3.12. CSL Concept and Concept Rule Learner

Figure 30:
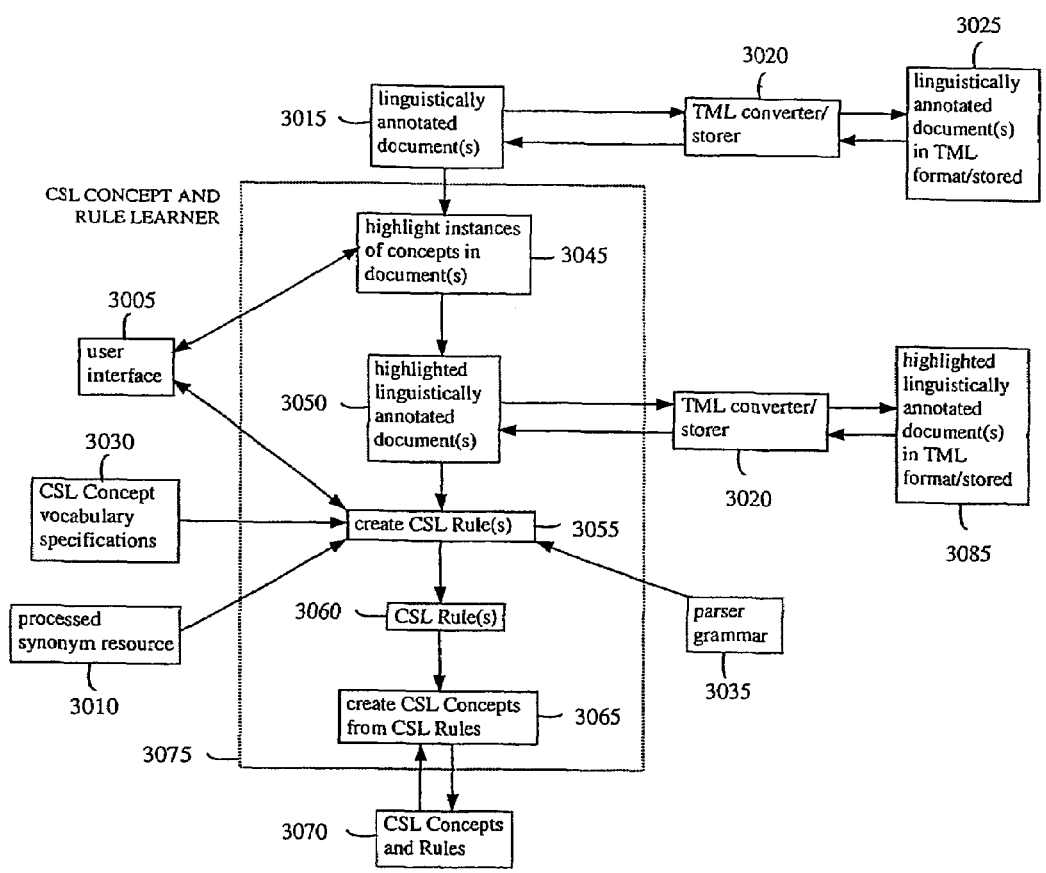
FIG. 30 is a block diagram of the CSL Concept and Concept Rule learner module shown in FIG. 29 with linguistically annotated documents as input.
Figure 31:
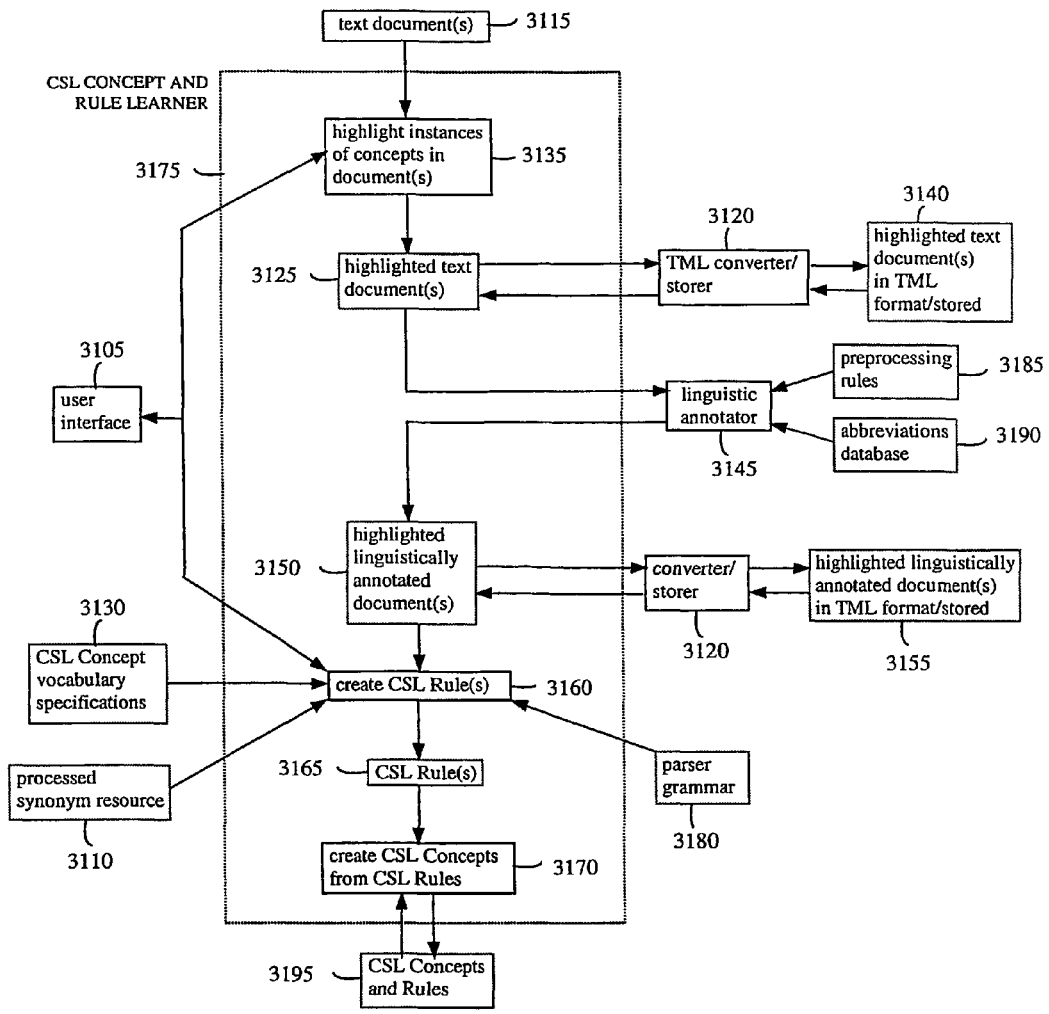
FIG. 31 is a block diagram of the CSL Concept and Concept Rule learner module shown in FIG. 29 with text documents as input.
Figure 32:
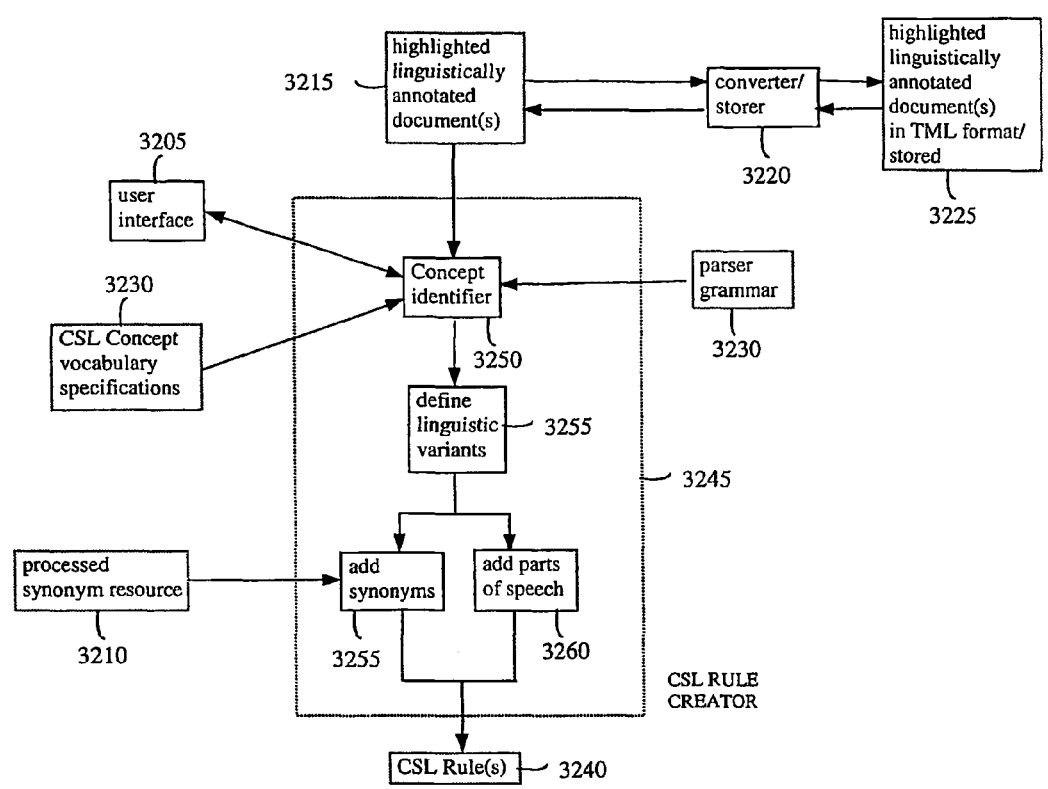
FIG. 32 is a block diagram of the CSL Rule creator module shown in FIG. 30 and FIG. 31.

FIG. 30 and FIG. 31 are simplified block diagrams of the CSL Concept and Concept Rule learner 3075 and 3175.

The CSL Concept and Concept Rule learner 3075 and 3175, accessed by the user interface 3005 and 3105, takes as input a text corpus in which instances of a given concept have been highlighted 3045 and 3135, and it outputs a list of CSL Concepts and Concept Rules 3070 and 3195, covering the occurrences marked up in the input corpus. The CSL Concept and Concept Rule learner 3075 and 3175 comprises two main internal methods: highlighted linguistically annotated documents 3050 and 3150 are passed to a CSL Rule creator 3055 and 3160 which produces CSL Rules 3060 and 3165. These CSL Rules 3060 and 3165 are input to a method that creates CSL Concepts from Concept Rules 3065 and 3170, which outputs a list of CSL Concepts and Concept Rules 3070 and 3195.

FIG. 30 and FIG. 31 present two different ways that instances of concepts may be highlighted. In FIG. 30, the CSL Concept and Concept Rule learner 3075 comprises first of all the highlighting of instances of concepts 3045 in the text of linguistically annotated documents 3015 to produce highlighted linguistically annotated documents 3050. Those linguistically annotated documents 3015 may be converted to TML 3020 (or some other format) and may also be stored 3025. Those highlighted linguistically annotated documents 3050 may also be converted to TML 3020 (or some other format) and may also be stored 3085.

In FIG. 31, the CSL Concept and Concept Rule learner 3175 comprises first of all the highlighting of instances of concepts 3135 in the text of documents 3115 to produce highlighted text documents 3125. The linguistic annotator 3145 processes those highlighted documents 3125 to produce highlighted linguistically annotated documents 3150. Those highlighted text documents 3125 may be converted to TML 3120 (or some other format) and may also be stored 3140. The highlighted linguistically annotated documents 3150 may also be converted to TML 3120 (or some other format) and may also be stored 3155.

2.3.13. CSL Rule Creator

FIG. 31 is a simplified block diagram of the CSL Rule creator 3245. The CSL Rule creator 3245 takes as input CSL vocabulary specifications 3230 and highlighted linguistically annotated documents 3215 and outputs CSL Rules 3240. The CSL vocabulary specifications 3230 and highlighted linguistically annotated documents 3215 are matched together using the Concept identifier 3250. Then linguistic variants are defined 3255; synonyms 3255 are add d from a processed synonym resource 3210 (if available), and parts of speech 3260 are also added before CSL Rules 3240 are produced.

2.3.14. CSL Query Checker

Figure 33:
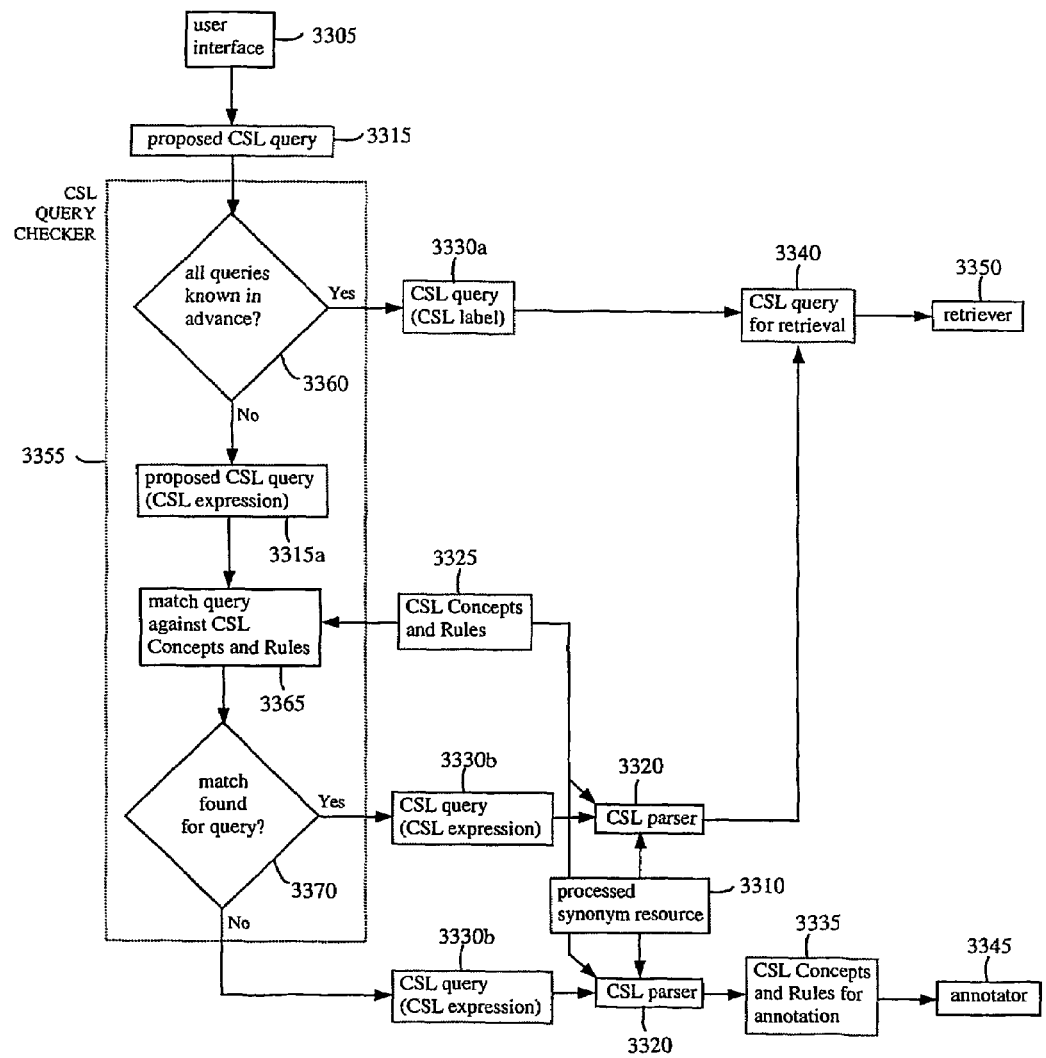
FIG. 33 is a block diagram of the CSL query checker module shown in FIG. 29.

FIG. 33 is a simplified block diagram of the CSL query checker 3355. The CSL query checker 3355, accessed by the user interface 3305, takes as input a proposed CSL query 3315 and, if all queries are known in advance 3360, passes that query (a concept label) 3330a to the retriever 3350. The retriever 3350 is part of the text document retriever 3545 (see FIG. 35).

If all queries are not known in advance 3360, the CSL query checker 3355 matches 3365 the proposed query 3315a against known CSL Concepts and Concept Rules 3325 and, if a match is found 3370, the query (a CSL expression) 3330b is parsed 3320 and passed to the retriever 3350, else the query (also a CSL expression) 3330b is parsed 3320 and added to the list of CSL Concepts and Concept Rules to be annotated 3335, which are then passed to the annotator 3345.

2.3.15. CSL Parser

Figure 34:
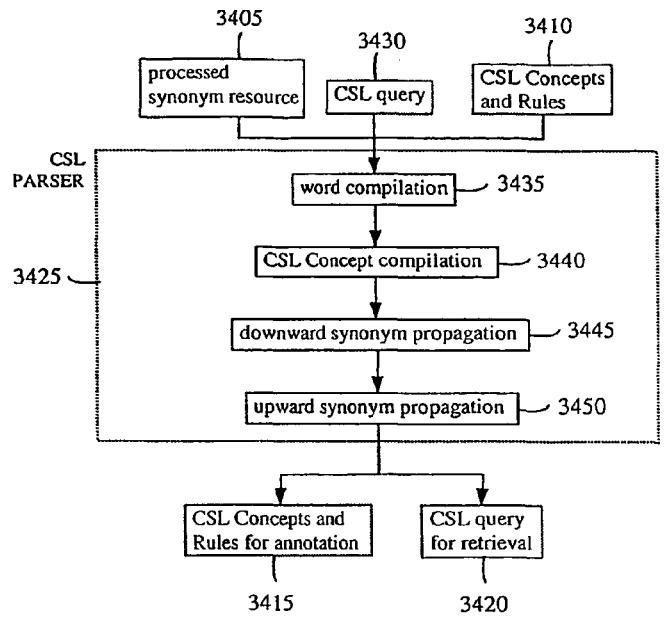
FIG. 34 is a block diagram of the CSL parser module shown in FIG. 2.

FIG. 34 is a simplified block diagram of the CSL parser 3425. The CSL parser 3425 takes as input a CSL query 3430 (3330b from FIG. 33), CSL Concepts and Rules 3410, and a processed synonym resource 3405, if available. It outputs CSL Concepts and Rules for annotation 3415 and also outputs parsed CSL queries for retrieval 3420. In the output, information left implicit in the input CSL Rules (e.g., about possible tags and synonyms) is made explicit.

The CSL parser 3425 comprises word compilation 3435, CSL Concept compilation 3440, downward synonym propagation 3445, and upward synonym propagation 3450.

Concepts are parsed as follows. Word synonyms (from the processed synonym resource 3405) are propagated throughout the tag hierarchy. This lets the input describe a word as a noun and have its synonyms automatically defined for both singular and plural nouns, assuming that the tag hierarchy contains a tag for noun with children tags for singular and plural nouns. The levels above noun would also automatically contain the synonyms for noun, but they would be marked such that the words would only match if they are tagged as nouns.

A processed synonym resource 3405 (derived from, e.g., WordNet) provides synonyms for words at levels in the tag hierarchy that are referenced. (Synonyms are only propagated to levels in the tag hierarchy that are referenced.)

In word compilation 3435, each word is compiled into a suitable structure.

In Concept compilation 3440, each Concept is compiled into a suitable structure. For every Concept, a word structure is added for each reference to an undefined word.

In downward synonym propagation 3445, for every word, synonyms are propagated down the tag hierarchy. Synonyms that move down take on the tag value given by the position in the hierarchy.

In upward synonym propagation 3450, for every word, synonyms are propagated up the tag hierarchy. Synonyms that move up take on a combination of the tag values given by the positions that they came from in the hierarchy.

2.3.16. Text Document Retriever

Figure 35:
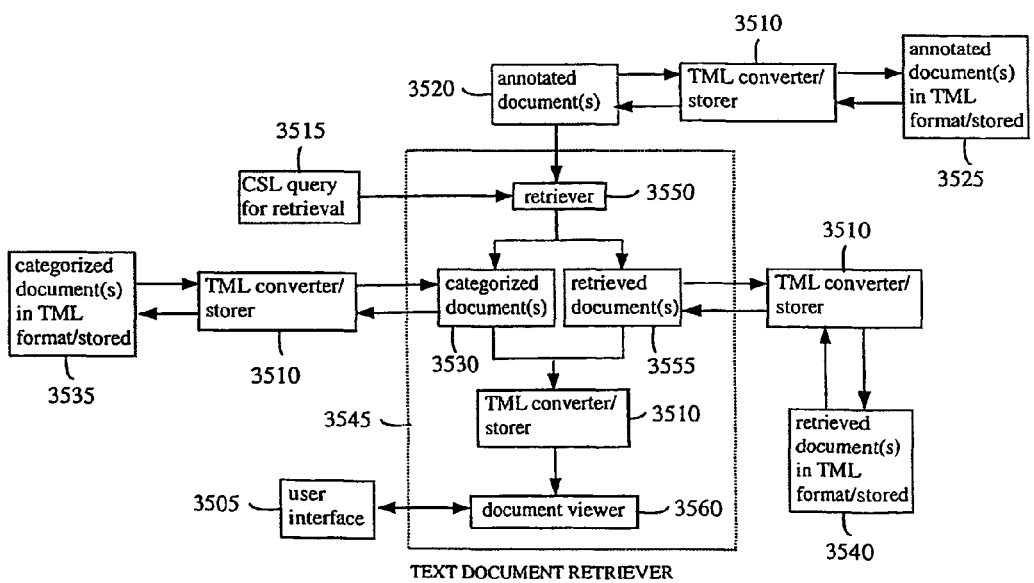
FIG. 35 is a block diagram of the text document retriever module shown in FIG. 2.

FIG. 35 is a simplified block diagram of the text document retriever 3545. The text document retriever 3545, accessed by the user interface 3505, comprises a retriever 3550. The retriever 3550 takes as input annotated documents 3520 (that is, conceptually annotated documents) and a CSL query for retrieval 3515.

The annotated documents 3520 contain the names of Concepts that were matched by the Concept identifier during conceptual annotation (940 and 935 respectively in FIG. 9). If the Concept identifier was index-based, the annotated documents 3520 also contain inverted index information. The retriever 3550 searches through the annotated documents 3520 for the names of Concepts that match specific CSL expressions in a CSL query for retrieval 3515.

The retriever 3550 produces retrieved documents 3555 and categorized documents 3530. Categorized documents 3530 used for retrieval 3550 may have been stored 3535 and may have been converted from TML 3510 or some other format. Similarly, categorized documents 3530 discovered during retrieval 3550 may be stored 3535 and may have been converted from TML 3510 or some other format. Retrieved documents 3555 have the same storage and conversion possibilities (3510 and 3540).

The retriever 3550 passes retrieved documents 3555 and categorized documents 3530 to a document viewer 3560 accessed by the user interface 3505.

3. Concept Specification Language

This section contains a description of the syntax of CSL. CSL is a language for expressing linguistically-based patterns. It is comprised of tag hierarchies, Concepts, Concept Rules, Patterns, Operators, and macros.

A tag hierarchy is a set of declarations. Each declaration relates a tag to a set of tags, declaring that each of the latter tags is to be considered an instance of the former tag.

A Concept in the CSL is used to represent concepts. A Concept can either be global or internal to other Concepts. A Concept uses words and other Concepts in the definition of Concept Rules.

A Concept Rule comprises an optional name internal to the Concept followed by a Pattern.

A Pattern may match
a) single terms in an annotated text (a "single-term Pattern") or
b) some configuration in an annotated text (a "configurational Pattern").

A single-term Pattern may comprise a reference to
a) the name of a word, and optionally,
b) its part of speech tag (a simple lexical tag or phrasal tag), and optionally,
c) synonyms of the word.

A configurational Pattern may consist of the form A Operator B, where the Operator is Boolean:

A configuration is any expression in the notation used to represent syntactic descriptions (for instance, trees or labelled bracketing).

A configurational Pattern may consist of the form A Operator B, where the Operator is of two types:
a) Dominance, and
b) Precedence.

A configurational Pattern may consist of the form A Dominates B, where
a) A is a syntactic constituent (which can be identified by a phrasal tag, though not necessarily);
b) B is any Pattern
(the entire Pattern matches any configuration where what B refers to is a subconstituent of A).

A configurational Pattern A Dominates B may be "wide-matched," meaning that the interval of A in a text is returned instead of B; that is, the interval of a dominant expression (A) is returned rather than the interval of a dominated expression (B). The term "interval" was defined earlier as referring to a consecutive sequence of words in a text. An interval can be represented in various ways, for instance, as two integers separated by a dash, where the first integer is the start position; and the second integer is the end position. For example, in the Text Tree in FIG. 11, cat occupies 1-1, and the cat occupies 0-1.

A configurational Pattern may consist of the form A Precedes B, where a) A is any Pattern;
b) B is any Pattern
(the entire Pattern matches any configuration where the constituent A refers to is before the constituent B refers to).

Boolean operators can be applied to any Patterns to obtain further Patterns.

Any of the Patterns thus defined is a CSL Expression.

A Pattern is fully recursive (i.e., subject to Patterns satisfying the arguments of the Operators defined above).

A Macro in the CSL represents a Pattern in a compact, parameterized form and can be used wherever a Pattern is used.

What is claimed is:

1. A method of information retrieval, performed on a computer system that matches text in documents and other text-forms against user-defined descriptions of concepts, comprising:
   a) identification of linguistic entities in the text of documents and other text-forms;
   b) annotation of said identified linguistic entities in a text markup language to produce linguistically annotated documents and other text-forms;
   c) storage of said linguistically annotated documents and other text-forms;
   d) identification of concepts using linguistic information, where said concepts are represented in a concept specification language and said concepts occur in one of:
      1) said text of documents and other text-forms in which linguistic entities have been identified in step a); or
      2) said linguistically annotated documents and other text-forms of step b); or
      3) stored linguistically annotated documents and other text-forms of step c);
   e) annotation of said identified concepts in said text markup language to produce conceptually annotated documents and other text-forms;
   f) storage of said conceptually annotated documents and other text-forms;
   g) defining and learning concept representations of said concept specification language, including:
      1) marking up instances of concepts in the text of documents and other text-forms;
      2) creating new concept representations in the concept specification language from said marked up instances of concepts; and
      3) adding and, if necessary, integrating said new concept representations in the concept specification language with pre-existing concept representations in said language;
   h) checking user-defined descriptions of concepts represented in said concept specification language; and
   i) retrieval by matching said user-defined descriptions of concepts against said conceptually annotated documents and other text-forms.

2. The method according to claim 1 wherein said identification of linguistic entities in the text of documents and other text-forms comprises identification of morphological, syntactic, and semantic entities.

3. The method according to claim 2 wherein said identification of linguistic entities in the text of documents and other text-forms comprises identifying words and phrases, and establishing dependencies between words and phrases.

4. The method according to claim 3 wherein said identification of linguistic entities in the text of documents and other text-forms is accomplished by a method selected from one or more of:
   a) preprocessing of text of documents and other text-forms;
   b) tagging of text of documents and other text-forms;
   c) parsing of text of documents and other text-forms.

5. The method according to claim 4 wherein annotation of said identified linguistic entities in the text of documents and other text-forms is linguistic annotation and produces a representation of linguistically annotated documents and other text-forms in a text markup language.

6. The method according to claim 5 wherein said linguistically annotated documents and other text-forms are stored.

7. The method according to claim 1 wherein in said identification of concepts using linguistic information said concepts are represented in a concept specification language and said concepts occur in one of:
   a) said text of documents and other text-forms in which linguistic entities have been identified to produce said linguistically annotated documents and other text-forms by means of a method comprising:
      1) identification of morphological, syntactic, and semantic entities;
      2) identification or words and phrases, and establishment of dependencies between words and phrases; and
      3) at least one of:
         i) preprocessing of text of documents and other text-forms;
         ii) tagging of text of documents and other text-forms;
         iii) parsing of text of documents and other text-forms; or
   b) said linguistically annotated documents and other text-forms wherein said annotation of said identified linguistic entities in the text of documents and other text-forms comprises linguistic annotation and produces a representation of linguistically annotated documents and other text-forms in a text markup language; or
   c) said stored linguistically annotated documents and other text-forms in a text markup language.

8. The method according to claim 7 wherein said concept specification language allows representations to be defined for concepts in terms of a linguistics-based pattern or set of patterns, where each pattern consists of words, phrases, other concepts, and relationships between words, phrases, and concepts.

9. The method according to claim 8 wherein said identification of concepts using linguistic information, when used with said concept specification language, consists of applying representations of concepts for the purpose of identifying concepts.

10. The method according to claim 7 wherein annotation of said identified concepts in linguistically annotated documents and other text-forms is conceptual annotation and produces a representation of conceptually annotated documents and other text-forms in a text markup language.

11. The method according to claim 10 wherein said conceptually annotated documents and other text-forms are stored.

12. The method according to claim 7 wherein said identification of concepts uses linguistic information, and said concepts are represented in a concept specification language, as a result of methods for identifying comprising:

a) compiling an expression from said concept specification language into finite state automata (FSAs);
b) matching said FSAs against linguistic entities in said linguistically annotated text.

13. The method according to claim 12 wherein concepts from said concept specification language are compiled into finite state automata (FSAs) and said compilation into FSAs comprises one or both of the following:
   a) the grammar from the parser used within the method to parse linguistically annotated text; and
   b) sets of synonyms.

14. The method according to claim 7 wherein said identification of concepts uses linguistic information, and said concepts are represented in a concept specification language, as a result of methods for identifying concepts comprising recursive descent matching which consists of traversing an expression in said concept specification language and recursively matching constituents of said expression against linguistic entities in linguistically annotated text.

15. The method according to claim 14 wherein said identification of concepts uses recursive descent matching and wherein said recursive descent matching comprises sets of synonyms.

16. The method according to claim 7 wherein said identification of concepts uses linguistic information, and said concepts are represented in a concept specification language, as a result of methods for identifying concepts which comprise bottom-up matching comprising:
   a) generating in a bottom-up fashion multiple spans, where each span is:
      1) a word or constituent and, optionally, structural information about the word or constituent, or
      2) a set of words and constituents that follow each other and, optionally, structural information about the words or word and constituents or constituent;
   b) generating in a bottom-up fashion spans consumed by single-term patterns in an expression in said concept specification language;
   c) generating in a bottom-up fashion spans consumed by operators in an expression in said concept specification language; and
   d) matching in a bottom-up fashion said spans against linguistic entities in linguistically annotated text.

17. The method according to claim 16 wherein identification of concepts using bottom-up matching, where said bottom-up matching comprises sets of synonyms.

18. The method according to claim 7 wherein said identification of concepts uses linguistic information, and said concepts are represented in a concept specification language, as a result of methods for identifying concepts that are index-based comprising use of an inverted index, where:
   a) said inverted index contains words, constituents, and tags for linguistic information, comprising syntactic information, from linguistically annotated text;
   b) said inverted index contains spans for said words, constituents, and tags from linguistically annotated text; and
   c) where each span is:
      1) a word or constituent and, optionally, structural information about the word or constituent, or
      2) a set of words and constituents that follow each other and, optionally, structural information about the words or word and constituents or constituent.

19. The method according to claim 18 wherein said identification of concepts uses linguistic information, and said concepts are represented in a concept specification language, as a result of index-based methods for identifying concepts comprising index-based matching, where said index-based matching comprises:
   a) using backtracking to resolve the constraints of operators in an expression in said concept specification language;
   b) attaching iterators to all items in the expression in said concept specification language;
   c) using the iterators to produce matches of all items in the expression in said concept specification language against text in the inverted index;
   d) maintaining a state for the iterator for each item in the expression in said concept specification language where that state is used to determine whether or not it has been processed before in the match of said expression against said inverted index, and also relevant information about the progress of the match;
   e) maintaining a state for the iterator for each item that is a word in the expression in said concept specification language where that state comprises: a list of applicable synonyms of the word in question, and the current synonym being used for matching; an iterator into the inverted index that can enumerate all instances of the word in said index, and which records the current word;
   f) during the course of a match, each item in the expression in said concept specification language is tested, and if successful, returns a set of spans covering the match of its corresponding sub-expression (i.e., components of said expression).

20. The method according to claim 19 wherein said identification of concepts uses index-based matching, where said index-based matching comprises sets of synonyms.

21. The method according to claim 18 wherein said identification of concepts uses linguistic information, and said concepts are represented in a concept specification language, as a result of index-based methods for identifying concepts comprising candidate checking index-based matching where said candidate checking index-based matching comprises identifying sets of candidate spans, where:
   a) a candidate span is a span that may contain a concept to be identified;
   b) any span that is not covered by a candidate span from the sets of candidate spans is one that cannot contain a concept to be identified;
   c) each sub-expression of an expression in the concept specification language is associated with a procedure; and
   d) each such procedure is used to generate candidate spans or to check whether a given span is a candidate span.

22. The method according to claim 21 wherein said identification of concepts uses linguistic information, and said concepts are represented in a concept specification language, as a result of index-based methods for identifying concepts comprising candidate checking index-based matching where said candidate checking index-based matching produces candidate spans that serve as input to concept identification methods comprising compiling and matching finite state automata, recursive descent matching, bottom-up matching, and index based matching.

23. The system according to claim 21 wherein said CSL processor, accessed by said user interface, comprises a CSL Concept and Concept Rule learner, and a CSL query checker.

24. The system according to claim 23 wherein said CSL Concept and Concept Rule learner comprises:

a) highlighting instances of Concepts in the text of documents;
b) creating new CSL Rules from said highlighted instances of Concepts;
c) creating new CSL Concepts from said CSL Rules;
d) adding and, if necessary, integrating said new CSL Concepts and Concept Rules with pre-existing CSL Concepts and Concept Rules.

25. The system according to claim 24 wherein creating new CSL Rules comprises:
a) using the Concept identifier to match together CSL vocabulary specifications and highlighted linguistically annotated documents;
b) defining linguistic variants;
c) adding synonyms from a set of synonyms;
d) adding parts of speech.

26. The system according to claim 24 wherein said CSL Concept and Concept Rule learner comprises means for:
a) highlighting instances of Concepts in the text of documents to produce highlighted documents;
b) linguistic annotation of said documents to produce highlighted linguistically annotated documents;
c) said highlighted text documents can be either produced on demand or stored in TML or other formats;
d) said highlighted linguistically annotated documents can be either produced on demand or stored in TML or other formats;
e) producing new and CSL Concept Rules from said highlighted instances of Concepts in said highlighted linguistically annotated documents; and
f) adding and, if necessary, integrating said new CSL Concepts and Concept Rules with pre-existing CSL Concepts and Concept Rules.

27. The system according to claim 23 wherein said CSL Concept and Concept Rule learner comprises means for:
a) highlighting instances of Concepts in the text of linguistically annotated documents to produce highlighted linguistically annotated documents; where
b) said linguistically annotated documents can be either produced on demand or stored in TML or other formats; and
c) said highlighted linguistically annotated documents can be either produced on demand or stored in TML or other formats;
d) producing new CSL Concept Rules from said highlighted instances of Concepts in said highlighted linguistically annotated document; and
e) adding and, if necessary, integrating said new CSL Concepts and Concept Rules with pre-existing CSL Concepts and Concept Rules.

28. The system according to claim 23 wherein said CSL query checker, accessed by said user interface, takes as input a proposed CSL query and, if all queries are known in advance, passes said query to the retriever.

29. The system according to claim 23 wherein said CSL query checker accessed by said user interface, takes as input a proposed CSL query and, if all queries are not known in advance, matches said query against known CSL Concepts and Concept Rules and, if a match is found, then the query is parsed with a CSL parser and passed to the retriever.

30. The system according to claim 23 wherein said CSL query checker, accessed by said user interface, takes as input a proposed CSL query and, if all queries are not known in advance, matches said query against known CSL Concepts and Concept Rules and, if a match is not found, then the query is parsed with a CSL parser and added to the list of CSL Concepts and Concept Rules to be annotated, which are then passed to the annotator.

31. The method according to claim 7 wherein said identification of concepts uses linguistic information, and said concepts are represented in a concept specification language, as a result of methods for identifying concepts comprising using an inverted index with compiling and matching finite state automata, recursive descent matching, bottom-up matching, and index based matching.

32. The method according to claim 1 wherein said concept representations to be defined and learned comprise hierarchies, rules, operators, patterns, and macros.

33. The method according to claim 1 wherein creating new concept representations of said concept specification language comprises:
a) using concept identification methods to match together concept specification language vocabulary specifications and highlighted linguistically annotated documents and other text-forms;
b) defining linguistic variants;
c) adding synonyms from a set of synonyms;
d) adding parts of speech.

34. The method according to claim 1 further comprising the step of defining and learning said concept representations of said concept specification language comprising:
a) highlighting instances of concepts in the text of linguistically annotated documents and other text-forms to produce highlighted linguistically annotated documents and other text-forms; where
b) said linguistically annotated documents and other text-forms are stored or produced on demand; and
c) said highlighted linguistically annotated documents and other text-forms are stored or produced on demand;
d) producing new concept representations in the concept specification language from said highlighted instances of concepts in said highlighted linguistically annotated documents and other text-forms; and
e) adding and, if necessary, integrating said new concept representations in the concept specification language with pre-existing concept representations in said language.

35. The method according to claim 1 further comprising the step of defining and learning said concept representations of said concept specification language comprising:
a) marking up instances of concepts in the text of documents and other text-forms to produce highlighted documents and other text-forms;
b) identification of linguistic entities in said highlighted documents and other text-forms and annotation of said documents and other text-forms to produce highlighted linguistically annotated documents and other text-forms;
c) said highlighted text documents and other text-forms are stored or produced on demand;
d) said highlighted linguistically annotated documents and other text-forms are stored or produced on demand;
e) producing new concept representations in the concept specification language from said highlighted instances of concepts in said highlighted linguistically annotated documents and other text-forms; and
f) adding and, if necessary, integrating said new concept representations in the concept specification language with pre-existing concept representations in said language.

36. The method according to claim 1 wherein said user-defined descriptions of concepts represented in said concept specification language comprise user queries to an information retrieval system, said user queries being represented in said concept specification language.

37. The method according to claim 36 wherein, if all known queries are represented in said concept specification language, then a proposed query represented in said concept specification language is subsequently used by said retrieval method.

38. The method according to claim 36 wherein, if all queries are not known in advance to be represented in said concept specification language, then a proposed query represented in said concept specification language is matched against a pre-stored repository of queries represented in said concept specification language and, if a match is found, then the query is subsequently used by said method of retrieval.

39. The method according to claim 36 wherein, if all queries are not known in advance to be represented in said concept specification language, then a proposed query represented in said concept specification language is matched against a pre-stored repository of queries represented in said concept specification language and, if a match is not found, then the query is subsequently used by said method of conceptual annotation.

40. The method according to claim 36 wherein retrieval matches said user-defined descriptions against said annotated text and retrieves matching documents and other text-forms.

41. The method according to claim 1 comprising:
   a) said annotation of said identified linguistic entities in a text markup language to produce linguistically annotated documents and other text-forms comprises annotation of said identified linguistic entities in a Text Markup Language (TML) to produce linguistically annotated documents and other text-forms;
   b) said identification of concepts using linguistic information comprises identification of Concepts and Concept Rules using linguistic information, where said Concepts and Concept Rules are represented in a Concept Specification Language (CSL) and said Concepts-to-be-identified and Concept Rules-to-be-identified occur in one of:
      1) said text of documents and other text-forms in which linguistic entities have been identified;
      2) said linguistically annotated documents and other text-forms; or
      3) said stored linguistically annotated documents and other text-forms;
   c) said annotation of said identified concepts in said text markup language to produce conceptually annotated documents and other text-forms comprises annotation of said identified Concepts and Concept Rules in said TML to produce conceptually annotated documents and other text-forms;
   d) defining and learning CSL Concepts and Concept Rules;
   e) said checking user-defined descriptions of concepts represented in said concept specification language comprises checking user-defined descriptions of Concepts and Concept Rules represented in CSL; and
   f) said retrieval by matching said user-defined descriptions of concepts against said conceptually annotated documents and other text-forms comprises retrieval by matching said user-defined descriptions of CSL Concepts and Concept Rules against said conceptually annotated documents and other text-forms.

42. A system for implementing said method according to claim 41 comprising one of:
   a) a server, comprising a communications interface to one or more clients over a network or other communication connection, one or more central processing units (CPUs), one or more input devices, one or more program and data storage areas comprising a module or submodules for an information retriever, and one or more output devices; and
   b) one or more clients, comprising a communications interface to a server over a network or other communication connection, one or more central processing units (CPUs), one or more input devices, one or more program and data storage areas comprising one or more submodules for an information retriever, and one or more output devices.

43. The system of claim 42 wherein the information retriever takes as input text in documents and other text-forms in the form of a signal from one or more input devices to a user interface, and carries out predetermined information retrieval processes to produce a collection of text in documents and other text-forms, which are output from the user interface in the form of a signal to one or more output devices.

44. The system according to claim 43 wherein predetermined information retrieval processes, accessed by said user interface, comprise a text document annotator, CSL processor, CSL parser, and text document retriever.

45. The system according to claim 44 wherein said text document annotator, accessed by said user interface, comprises a document loader from a document database, which passes text documents to the annotator, and outputs one or more annotated documents.

46. The system according to claim 45 wherein said annotator takes as input one or more text documents, outputs one or more annotated documents, and is comprised of a linguistic annotator which passes linguistically annotated documents to a conceptual annotator.

47. The system according to claim 46 wherein said linguistically annotated documents, are annotated with a representation in a Text Markup Language.

48. The system according to claim 46 wherein said Text Markup Language (TML) has the syntax of XML, and conversion to and from TML is accomplished with an XML converter.

49. The system according to claim 46 wherein said linguistic annotator, taking as input one or more text documents, and outputting one or more linguistically annotated documents, comprises one or more of the following:
   a) a preprocessor;
   b) a tagger; and
   c) a parser.

50. The system according to claim 49 wherein said preprocessor, taking as input one or more text documents or the documents output by any other appropriate linguistic identification process, and producing as output one or more preprocessed documents, comprises means for one or more of the following:
   a) breaking text into words;
   b) marking phrase boundaries;
   c) identifying numbers, symbols, and other punctuation;
   d) expanding abbreviations; and
   e) splitting apart contractions.

51. The system according to claim 49 wherein said tagger takes as input a set of tags, one or more preprocessed documents or the documents output by any other appropriate linguistic identification process and produces as output one or more documents tagged with the appropriate part of speech from a given tagset.

52. The system according to claim 49 wherein said parser takes as input one or more tagged documents or the documents output by any other appropriate linguistic identification process and produces as output one or more parsed documents.

53. The system according to claim 46 wherein said conceptually annotated documents are annotated with a representation in TML.

54. The system according to claim 53 wherein said conceptually annotated documents are stored.

55. The system according to claim 46 wherein said input of one or more linguistically annotated documents to said conceptual annotator comprises at least one of the following sources:
   a) the linguistic annotator directly;
   b) storage in some linguistically annotated form such as the representation produced by the final linguistic identification process of the linguistic annotator; and
   c) storage in TML followed by conversion from TML to the representation produced by the final linguistic identification process of the linguistic annotator.

56. The system according to claim 46 wherein said conceptual annotator comprises a Concept identifier.

57. The system according to claim 56 wherein said Concept identifier produces conceptually annotated documents as a result of:
   a) compiling CSL into finite state automata (FSAs);
   b) matching said FSAs against linguistically annotated documents.

58. The system according to claim 57 wherein said compilation into FSAs also includes as part of compilation one or both of the following:
   a) the grammar from the parser used by the system to parse linguistically annotated documents; and
   b) sets of synonyms.

59. The system according to claim 56 wherein said Concept identifier produces conceptually annotated documents as a result of recursive descent matching which consists of traversing an expression in CSL and recursively matching constituents of said expression against linguistic entities in linguistically annotated text.

60. The system according to claim 59 wherein said recursive descent matching comprises sets of synonyms.

61. The system according to claim 56 wherein said Concept identifier produces conceptually annotated documents as a result of bottom-up matching which comprises:
   a) generating in a bottom-up fashion multiple spans, where each span is:
      1) a word or constituent and, optionally, structural information about the word or constituent, or
      2) a set of words and constituents that follow each other and, optionally, structural information about the words or word and constituents or constituent;
   b) generating in a bottom-up fashion spans consumed by single-term patterns in an expression in CSL;
   c) generating in a bottom-up fashion spans consumed by operators in an expression in CSL; and
   d) matching in a bottom-up fashion said spans against linguistic entities in linguistically annotated documents.

62. The system according to claim 61 wherein said bottom-up matching, where bottom-up matching comprises sets of synonyms.

63. The system according to claim 61 wherein said Concept identifier using index-based methods produces conceptually annotated documents as a result of index-based matching, where said index-based matching comprises:

a) using backtracking to resolve the constraints of CSL operators in an expression in CSL;
   b) attaching iterators to all items in the CSL expression;
   c) using the iterators to produce matches of all items in the CSL expression against text in the inverted index;
   d) maintaining a state for the iterator for each item in the CSL expression where that state is used to determine whether or not it has been processed before in the match of said expression against said inverted index, and also relevant information about the progress of the match;
   e) maintaining a state for the iterator for each item that is a word in the expression in CSL where that state comprises the following information: a list of applicable synonyms of the word in question, and the current synonym being used for matching; an iterator into the inverted index that can enumerate all instances of the word in said index, and which records the current word;
   f) during the course of a match, each item in the CSL expression is tested, and if successful, returns a set of spans covering the match of its corresponding sub-expression (i.e., components of said CSL expression).

64. The system according to claim 63 wherein said index-based matching, where index-based matching comprises sets of synonyms.

65. The method according to claim 61 wherein said identification of concepts uses linguistic information, and said concepts are represented in a concept specification language, as a result of index-based methods for identifying concepts comprising candidate checking index-based matching where said candidate checking index-based matching comprises identifying sets of candidate spans, where
   a) a candidate span is a span that may contain a Concept to be identified (matched);
   b) any span that is not covered by a candidate span from the sets of candidate spans is one that cannot contain a Concept to be identified (matched);
   c) each sub-expression of a CSL expression is associated with a procedure;
   d) each such procedure is used to generate candidate spans or to check whether a given span is a candidate span.

66. The system according to claim 65 wherein said candidate spans produced by said candidate checking index-based matching serve as input to Concept identification methods comprising compiling and matching finite state automata, recursive descent matching, bottom-up matching, and index based matching.

67. The system according to claim 61 wherein said Concept identifier produces conceptually annotated documents as a result of methods for identifying Concepts comprising using an inverted index with compiling and matching finite state automata, recursive descent matching, bottom-up matching, and index based matching.

68. The system according to claim 56 wherein said Concept identifier produces conceptually annotated documents as a result of methods for identifying Concepts that are index-based comprising use of an inverted index, where:
   a) said inverted index contains words, constituents, and tags for linguistic information from linguistically annotated text;
   b) said inverted index contains spans for said words, constituents, and tags from linguistically annotated text; and c) where a span is:
1) a word or constituent and, optionally, structural information about the word or constituent, or
2) a set of words and constituents that follow each other and, optionally, structural information about the words or word constituents or constituent.

69. The system according to claim 46 wherein said conceptual annotator takes as input one or more linguistically annotated documents, a list of CSL Concepts and Concept Rules for annotation, and optionally data from a synonym resource, and outputs one or more conceptually annotated documents.

70. The system according to claim 44 wherein said CSL parser takes as input a synonym database, CSL query, and CSL Concepts and Rules, and outputs CSL Concepts and Rules for annotation as a result of the following:
a) word compilation;
b) Concept compilation;
c) downward synonym propagation; and
d) upward synonym propagation.

71. The system according to claim 44 wherein said text document retriever, accessed by said user interface, comprises a retriever which takes one or more annotated documents as input, passes retrieved and categorized documents to a TML converter, which passes them to a document viewer.

72. The system according to claim 41 wherein said user-defined descriptions of CSL Concepts and Concept Rules comprise user queries to an information retrieval system, said user queries being represented in CSL.

73. The method according to claim 41 wherein a tag hierarchy in the CSL is a set of declarations, each declaration relating a tag to a set of tags, declaring that each of the latter tags is to be considered an instance of the former tag.

74. The method according to claim 41 wherein a Concept in the CSL is used to represent concepts.

75. The method according to claim 74 wherein a Concept in the CSL can either be global or internal to other Concepts.

76. The method according to claim 74 wherein a Concept in the CSL uses words and other Concepts in the definition of Concept Rules.

77. The method according to claim 76 wherein a Concept Rule in the CSL comprises an optional name internal to the Concept followed by a Pattern.

78. The method according to claim 77 wherein a Pattern in the CSL maymatch:
a) single terms in an annotated text (a "single-term Pattern"); or
b) some configuration in an annotated text (a "configurational Pattern").

79. The method according to claim 78 wherein a configurational Pattern in the CSL consists of the form A Operator B, where the Operator is Boolean.

80. The method according to claim 79 wherein a Boolean operator in the CSL can be applied to any Patterns to obtain further Patterns.

81. The method according to claim 78 wherein a configurational Pattern in the CSL is any expression in the notation used to represent syntactic descriptions.

82. The method according to claim 81 wherein a configurational Pattern in the CSL consists of the form A Operator B, where the Operator is of two types:
a) Dominance, and
b) Precedence.

83. The method according to claim 82 wherein a configurational Pattern in the CSL consists of the form A Dominates B, where:

a) A is a syntactic constituent (which can be identified by a phrasal tag, though not necessarily);
b) B is any Pattern; and
c) the entire Pattern matches any configuration where what B refers to is a subconstituent of A.

84. The method according to claim 83 wherein a configurational Pattern in the CSL of the form A Dominates B is wide-matched, where said wide-matching returns the interval of the dominant expression A in a text is returned instead of the interval of the dominated expression B, and where said interval is a consecutive sequence of words in a text that is commonly though not necessarily represented as two integers separated by a dash.

85. The method according to claim 84 wherein a configurational Pattern in the CSL consists of the form A Precedes B, where:
a) A is any Pattern;
b) B is any Pattern; and
c) the entire Pattern matches any configuration where what B refers to is a subconstituent of A.

86. The method according to claim 78 wherein any of the Patterns defined in the CSL is a CSL Expression.

87. The method according to claim 78 wherein a Pattern defined in the CSL is fully recursive.

88. The method according to claim 78 wherein a Macro in the CSL represents a Pattern in a compact, parameterized form and can be used wherever a Pattern is used.

89. The method according to claim 78 wherein a single-term Pattern in the CSL comprises a reference to:
a) the name of a word;
b) optionally, its part of speech tag; and
c) optionally, synonyms of the word.

90. The method according to claim 41 wherein said Concepts, represented in said CSL, derive from the sublanguages used to analyze event-based specialized domains comprising insurance claims, business and financial reports, police incident reports, medical reports, and aviation incident reports.

91. A system for implementing said method according to claim 1 comprising one of:
a) a server, comprising a communications interface to one or more clients over a network or other communication connection, one or more central processing units (CPUs), one or more input devices, one or more program and data storage areas comprising a module or submodules for an information retriever, and one or more output devices; and
b) one or more clients, comprising a communications interface to a server over a network or other communication connection, one or more central processing units (CPUs), one or more input devices, one or more program and data storage areas comprising one or more submodules for an information retriever, and one or more output devices.

92. The system of claim 91 wherein the information retriever takes as input text in documents and other text-forms in the form of a signal from one or more input devices to a user interface, and carries out predetermined information retrieval processes to produce a collection of text in documents and other text-forms, which are output from the user interface in the form of a signal to one or more output devices.

93. The system according to claim 92 wherein predetermined information retrieval processes, accessed by said user interface, comprises:
a) identification of linguistic entities in the text of documents and other text-forms;

b) annotation of said identified linguistic entities in a text markup language to produce linguistically annotated documents and other text-forms;
c) storage of said linguistically annotated documents and other text-forms;
d) identification of concepts using linguistic information, where said concepts are represented in a concept specification language and said concepts to be identified occur in one of:
  1) said text of documents and other text-forms in which linguistic entities have been identified in step a), or
  2) said linguistically annotated documents and other text-forms of step b); or
  3) stored linguistically annotated documents and other text-forms of step c);
e) annotation of said identified concepts in said text markup language to produce conceptually annotated documents and other text-forms;
f) storage of said conceptually annotated documents and other text-forms;
g) defining and learning concept representations of said concept specification language;
h) checking user-defined descriptions of concepts represented in said concept specification language; and
i) retrieval by matching said user-defined descriptions of concepts against said conceptually annotated documents and other text-forms.

94. The method according to claim 1 wherein said concepts, represented in said concept specification language, derive from the sublanguages used to analyze event-based specialized domains comprising insurance claims, business and financial reports, police incident reports, medical reports, and aviation incident reports.

* * * * *